(12) United States Patent
Hu et al.

(10) Patent No.: US 11,615,816 B2
(45) Date of Patent: Mar. 28, 2023

(54) METHOD AND DEVICE FOR ADDING LYRICS TO SHORT VIDEO

(71) Applicant: BEIJING DAJIA INTERNET INFORMATION TECHNOLOGY CO., LTD., Beijing (CN)

(72) Inventors: Yanan Hu, Beijing (CN); Mu He, Beijing (CN); Changrui Feng, Beijing (CN); Yanan Liang, Beijing (CN); Haiyang Jiang, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/386,684

(22) Filed: Jul. 28, 2021

(65) Prior Publication Data
US 2022/0068314 A1    Mar. 3, 2022

(30) Foreign Application Priority Data
Aug. 28, 2020 (CN) .......................... 202010887615.6

(51) Int. Cl.
*G11B 27/00* (2006.01)
*G11B 27/10* (2006.01)
(Continued)

(52) U.S. Cl.
CPC ............ *G11B 27/036* (2013.01); *G06F 3/165* (2013.01); *G10L 25/81* (2013.01); *G11B 27/007* (2013.01);
(Continued)

(58) Field of Classification Search
USPC ....... 386/239, 246, 245, 244, 241, 278, 280, 386/285
See application file for complete search history.

(56) References Cited

U.S. PATENT DOCUMENTS 6,053,740 A * 4/2000 Nakata .................. G10H 1/368
345/685
9,521,375 B2 * 12/2016 Beaumier .......... H04N 21/4223
(Continued)

FOREIGN PATENT DOCUMENTS

CN    107026986 A    8/2017
CN    107786876 A    3/2018
(Continued)

OTHER PUBLICATIONS

European Patent Office, Search Report for EP application 21188126.3, dated Dec. 10, 2021.
(Continued)

*Primary Examiner* — Daquan Zhao
(74) *Attorney, Agent, or Firm* — Timothy W. Menasco, Esq.; Harter Secrest & Emery LLP

(57) ABSTRACT

Methods and devices are provided for adding lyrics to a short video. The device obtains a music material required by the short video and obtains a first playback duration of the short video. The device obtains a target music material having a playback duration matching the first playback duration. The device obtains a lyric sticker corresponding to the target music material based on the lyrics extracted from the target music material and displays a processed short video after adding with the lyric sticker.

16 Claims, 36 Drawing Sheets

(51) Int. Cl.
    *H04N 5/04*     (2006.01)
    *H04N 5/278*    (2006.01)
    *G11B 27/036*   (2006.01)
    *G06F 3/16*     (2006.01)
    *G10L 25/81*    (2013.01)

(52) U.S. Cl.
    CPC ............... *G11B 27/10* (2013.01); *H04N 5/04* (2013.01); *H04N 5/278* (2013.01)

(56) References Cited

U.S. PATENT DOCUMENTS

| | | | |
|---|---|---|---|
| 11,126,344 B2* | 9/2021 | Okafor | G11B 27/031 |
| 11,264,002 B2* | 3/2022 | Ackerman | G10H 1/0025 |
| 2012/0221975 A1* | 8/2012 | Juristovski | G10H 1/365 |
| | | | 715/823 |
| 2014/0109046 A1* | 4/2014 | Hirsch | G06F 9/44 |
| | | | 717/120 |
| 2014/0229829 A1* | 8/2014 | Mazur | G06F 3/165 |
| | | | 715/716 |
| 2018/0004740 A1* | 1/2018 | Liang | G06Q 50/01 |
| 2019/0355337 A1 | 11/2019 | Steinwedel et al. | |
| 2020/0233574 A1 | 7/2020 | Okafor et al. | |
| 2021/0055905 A1* | 2/2021 | Moldover | H04N 21/233 |

FOREIGN PATENT DOCUMENTS

| | | |
|---|---|---|
| CN | 108597546 A | 9/2018 |
| CN | 109672832 A | 4/2019 |
| CN | 110619673 A | 12/2019 |
| CN | 111491211 A | 8/2020 |

OTHER PUBLICATIONS

Marshall Gunnell, How to Add Music to Your PowerPoint Presentation, How-To Geek, Jan. 2, 2019.

Oli Ori, How to Make a Lyric Music Video With PowerPoint, Jan. 29, 2018.

State Intellectual Property Office, Office Action for CN application 202010887615.6 with English translation, dated Nov. 9, 2022.

* cited by examiner

METHOD AND DEVICE FOR ADDING LYRICS TO SHORT VIDEO

CROSS-REFERENCE TO RELATED APPLICATION[S]

This application is based on and claims priority to Chinese Patent application No. 202010887615.6, filed on Aug. 28, 2020, in the China National Intellectual Property Administration, the disclosure of which is herein incorporated by reference in its entirety.

FIELD

The disclosure relates to a field of video processing technologies, and more particularly to a method and a device for adding lyrics to a short video, an apparatus, an electronic device, and a storage medium.

BACKGROUND

With rapid development of mobile terminal technologies, application software with various functions has emerged, which can bring convenience and entertainment to users. Through statistics of historical search keyword data, the search volume related to the keyword "add lyrics to a short video" has been high. In other words, in recent years, the demand for users to add the lyrics to the short video has become stronger and stronger.

SUMMARY

A method for adding lyrics to a short video is provided. According to an embodiment of the disclosure, method includes obtaining a music material required by a short video; obtaining a first playback duration of the short video; generating a target music material corresponding to the short video based on the first playback duration, where a playback duration of the target music material matches the first playback duration; and generating a lyric sticker corresponding to the target music material based on the lyrics extracted from the target music material and displaying the short video added with the lyric sticker.

An electronic device. According to an embodiment of the disclosure, the electronic device includes a processor; and a memory configured to store instructions executable by the processor. The processor is configured to execute the instructions to implement a method for adding lyrics to a short video described above.

A non-transitory computer readable storage medium is provided. According to an embodiment of the disclosure, when instructions in the storage medium are executed by a processor of an electronic device, the electronic device is configured to execute a method for adding lyrics to a short video described above.

It is to be understood that, the above general description and the following detailed description are only exemplary and explanatory, and do not limit the disclosure.

BRIEF DESCRIPTION OF THE DRAWINGS

The above information is presented as background information only to assist with an understanding of the disclosure. No determination has been made, and no assertion is made, as to whether any of the above might be applicable as prior art with regard to the disclosure.

DETAILED DESCRIPTION

In order to enable the skilled person in the art to well understand technical solutions of the disclosure, the technical solution according to embodiments of the disclosure will be described clearly and completely with reference to the accompanying drawings.

It should be noted that terms "first" and "second" in the specification, appended claims and the above-mentioned drawings are used to distinguish similar objects, and not necessarily used to describe a specific sequence or sequence. It is to be understood that features defined by these terms can be interchanged in appropriate circumstances such that embodiments of the disclosure described herein can be implemented in an order other than those illustrated or described herein. The implementation manners described in following embodiments do not represent all implementation manners consistent with the disclosure, instead, they are only examples of devices and methods consistent with some aspects of the disclosure as detailed in the appended claims.

Figure 1:
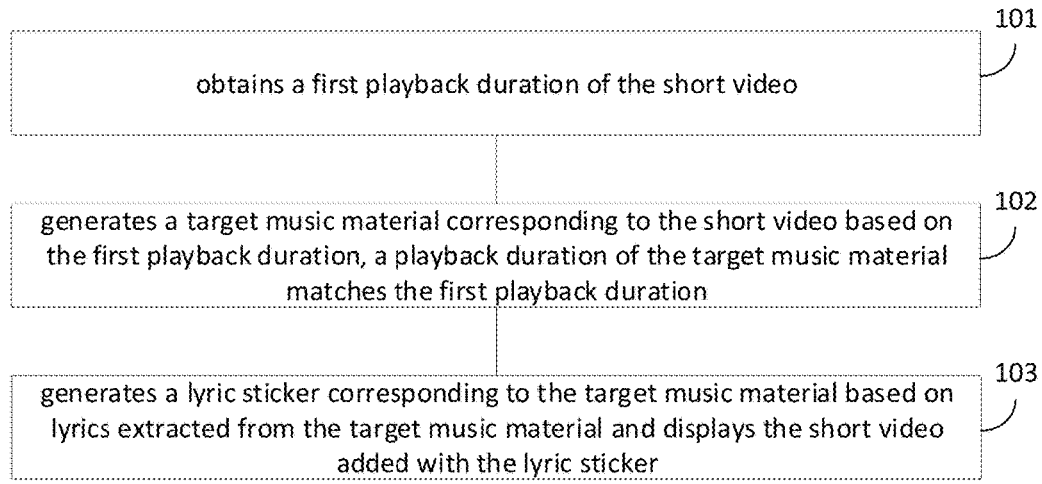
FIG. 1 is a flowchart illustrating a method for adding lyrics to a short video according to embodiments of the disclosure.

FIG. 1 is a flowchart illustrating a method for adding lyrics to a short video according to embodiments of the disclosure. As illustrated in FIG. 1, the method for adding lyrics to a short video includes the following.

At 101, a first playback duration of a short video is obtained.

It is to be noted that an execution subject of the method for adding lyrics to a short video according to the disclosure is a device for adding lyrics to a short video. The method for adding lyrics to a short video according to embodiments of the disclosure can be executed by the device for adding lyrics to a short video according to embodiments of the disclosure. The device for adding lyrics to a short video may be a hardware device, or software in a hardware device. The hardware device may be a terminal device, a server, or the like.

In an example, the short video, i.e., short-form video, refers to a video with a playback duration less than 5 minutes. In another example, the short video refers to a video album containing at least two photos. As still another example, the short video refers to a video collection containing one or more videos and having a total playback duration less than 5 minutes. As yet another example, the short video refers to a video file containing at least one photo and at least one video.

In embodiments of the disclosure, the short video can be acquired. The playback duration of the short video can be acquired as the first playback duration after the short video is acquired.

It is to be noted that for obtaining the short video, a pre-stored video in a local storage area or a remote storage area can be acquired, or a video can be directly recorded. In some examples, the stored video can be retrieved from a local video library, a remote video library, an image library, both the local video library and the remote video library, both the local video library and the image library, both the remote video library and the image library, and all of the local video library, the remote video library and the image library. In some examples, the video can be directly recorded. The way of obtaining the short video is not limited in embodiments of the disclosure, and the way can be selected based on actual situations.

It is to be noted that after the video is obtained in the above-mentioned ways, it can be determined whether the obtained video meets a processing condition. When it is identified that the duration of the video is less than or equal to a preset duration, it indicates that the acquired video meets the processing condition, and the acquired video can be regarded as the short video. When it is identified that the duration of the video is greater than the preset duration, it indicates that the acquired video does not meet the processing condition, the acquired video can be cut to obtain a video clip such that the duration of the video clip is less than or equal to the preset duration, and the video clip is used as the short video. The preset duration can be set based on actual conditions. For example, the preset duration can be set to 5 minutes or 60 seconds.

Further, when it is identified that the duration of the video is less than or equal to the preset duration, the duration of the video is used as the first playback duration. When it is identified that the duration of the video is greater than the preset duration, the preset duration is the first playback duration of the short video which is the video clip subjected to the video cutting.

At 102, a target music material corresponding to the short video is generated based on the first playback duration, where a playback duration of the target music material matches the first playback duration.

In some examples, the target music material is generated from a music material required by the short video. The music material required can be a sound effect. For example, the music material can be a sound material about animals and natural world, a background sound effect, and a song segment.

In some examples, for obtaining the music material required by the short video, an obtaining instruction can be automatically generated, and delivered audio and lyrics of the music material can be received.

It is to be noted that for obtaining the music material required by the short video, the music material pre-stored in a local storage area or a remote storage area can be obtained, or the music material can be recorded directly. As an example, the stored music material can be retrieved from at least one of a local audio library or a remote audio library as the music material required by the short video. As another example, the music material required by the short video can be directly recorded. The manner of obtaining the music material required by the short video is not limited in embodiments of the disclosure, which can be selected according to actual situations.

In an example, the target music material may be a music material whose playback duration is the same with the first playback duration. In another example, the target music material may be a music material containing a music material whose playback duration is shorter than the first playback duration and a part of audio of the music material. As still another example, the target music material can be a part of audio of a music material whose playback duration is longer than the first playback duration.

At 103, a lyric sticker corresponding to the target music material is generated based on lyrics extracted from the target music material and the short video added with the lyric sticker is displayed.

In some examples, after the target music material is obtained, the user can extract the lyrics from the target music material. The music material generally contains lyrics and audio, and the user can extract and edit the lyrics. For example, word effect and color of the lyrics, or length of the audio can be edited to generate the lyric sticker corresponding to the target music material.

Further, a playback timeline of the lyric sticker can be generated from a playback time of the target music material. The playback timeline of the lyric sticker is synchronized with the playback timeline of the short video. Lyrics to be displayed by the lyric sticker are synchronously updated based on a current playback progress of the short video.

It is to be noted that, to display an edited lyric sticker in the short video, relevant data of the target music material, i.e., image frames and playback times of the audio, are also synchronized while simultaneously updating the lyrics displayed by the lyric sticker based on the current playback progress of the short video, such that the edited target music material can be displayed synchronously with the short video.

In the disclosure, the interaction solution is simplified.

After the music material required by the short video and the first playback duration of the short video are obtained, a matched target music material is generated based on the first playback duration, a corresponding lyric sticker is generated based on the extracted lyrics, and the lyric sticker is added to the short video such that the lyric sticker can be displayed dynamically in the short video depending on the target music material.

In some examples, the number of interactions is reduced, the operation time is shortened, the learning cost is saved, and the user experience is improved.

It is to be noted that, in the disclosure, for generating the target music material whose playback duration matches the duration of the short video, a second playback duration of the music material is obtained, and the target music material is obtained by editing the music material based on the first playback duration and the second playback duration.

Figure 2:
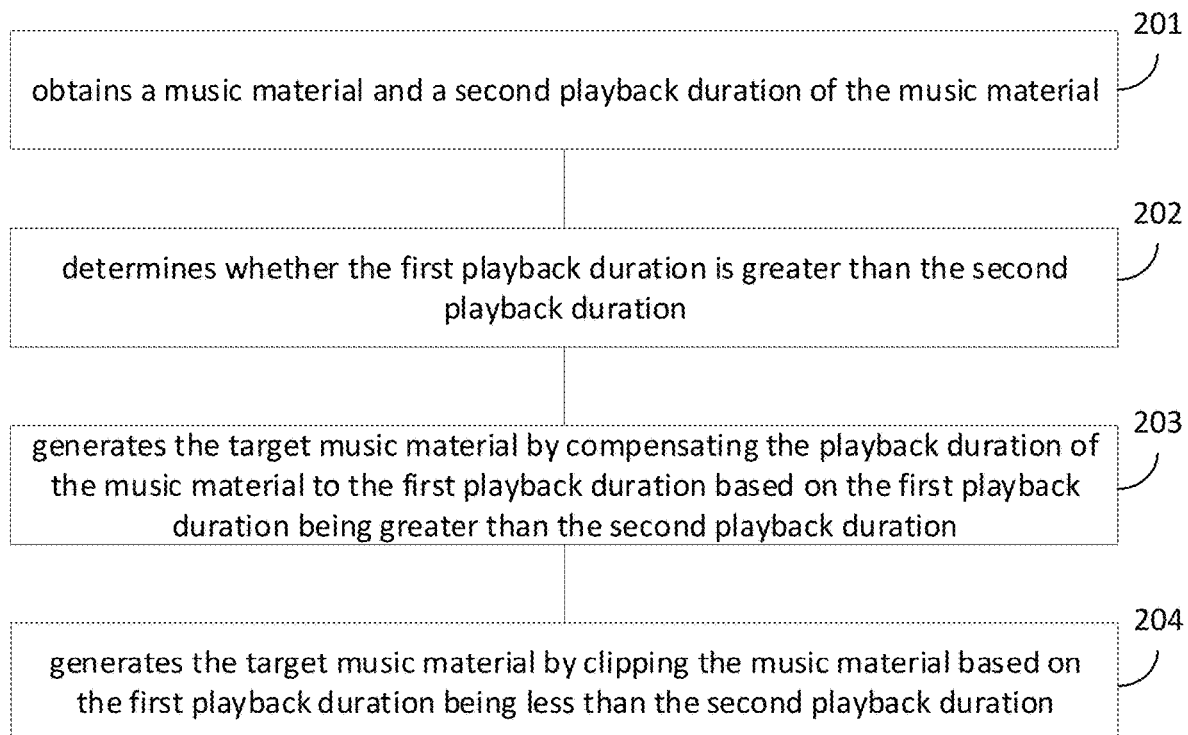
FIG. 2 is a flowchart illustrating another method for adding lyrics to a short video according to some embodiments of the disclosure.

As a possible implementation, as illustrated in FIG. 2, on the basis of the foregoing embodiments, generating the target music material corresponding to the short video based on the first playback duration at 103 includes the following.

At 201, a music material is obtained and a second playback duration of the music material is acquired.

In embodiments of the disclosure, after the music material required is obtained, the playback duration of the music material can be obtained as the second playback duration.

The second playback duration of the music material can be acquired. Unit of the first playback duration is consistent with the unit of the second playback duration. As an example, the first playback duration is 150 seconds, and the second playback duration is 125 seconds. As another example, the first playback duration is 1.5 minutes, and the second playback duration is 1.2 minutes.

At 202, it is determined whether the first playback duration is greater than the second playback duration.

In some examples, when it is identified that the first playback duration is greater than the second playback duration, that is, the playback duration of the short video is longer than the playback duration of the music material required, 203 can be performed. When it is identified that the first playback duration is less than the second playback duration, that is, the playback duration of the short video is shorter than the playback duration of the music material required, 204 can be performed. When it is identified that the first playback duration is equal to the second playback duration, that is, the playback duration of the short video is the same with the playback duration of the music material required and the music material required can be directly determined as the target music material without being edited.

At 203, when the first playback duration is greater than the second playback duration, the playback duration of the music material is compensated to the first playback duration to generate the target music material.

In some examples, when the first playback duration is greater than the second playback duration, a duration difference between the first playback duration and the second playback duration may be obtained, and the music material is played in a loop based on the duration difference to compensate the second playback duration to the first playback duration.

For compensating the playback duration of the music material to the first playback duration, the compensation method can be selected based on actual situations. The audio of the music material may be played in a loop until a sum of the second playback duration and a looped playback duration is the same with the first playback duration. For example, the playback duration of music material is 2 minutes, while the playback duration of short video is 3 minutes. In this case, the music material needs to be played in a loop, to extend the playback duration of the music material to 3 minutes.

At 204, when the first playback duration is less than the second playback duration, the music material is cut to generate the target music material.

In some examples, when the first playback duration is less than the second playback duration, a cutting position may be determined for the music material based on monitoring that there is a cutting operation for the music material. Further, the music material is truncated at the cutting position to generate the target music material.

As a possible implementation, a music segment can be selected by dragging an audio bar in an audio display area. At this time, lyrics corresponding to the selected music segment can be displayed in a lyric display area in synchronization. Within a box at a fixed position of the audio display area, the audio bar can be dragged to slide leftwards or rightwards.

Figure 3:
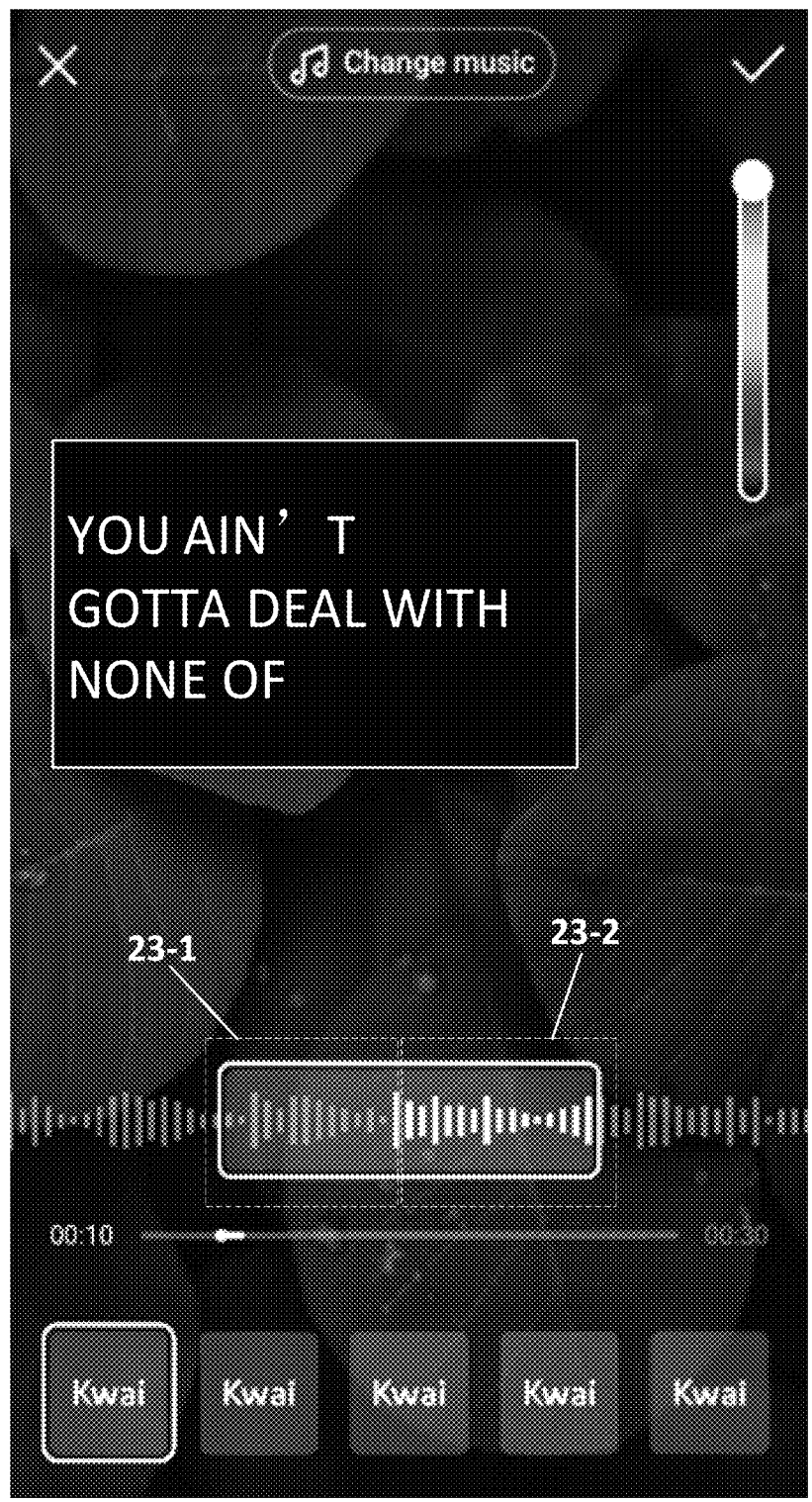
FIG. 3 is a schematic diagram illustrating displayed colors of sound waves in an audio display area according to embodiments of the disclosure.

It is to be noted that, to enable the user to accurately observe the cutting process, different colors can be set for sound waves displayed in the audio bar. For example, as illustrated in FIG. 3, when a cut music material is played, the color of the audio bar within the box can be displayed as orange 23-1. When an uncut music material is played, the color of the audio bar within the box is white 23-2.

In some embodiments of the disclosure, when it is identified that the first playback duration is greater than or equal to the second playback duration, a first reminder message that the cutting operation fails can be generated and displayed in the lyric display area to tell the user.

Language of the first reminder message can be selected based on actual situations to meet different language habits and preferences of the user. For example, the language can be set as Chinese or English.

Figure 4:
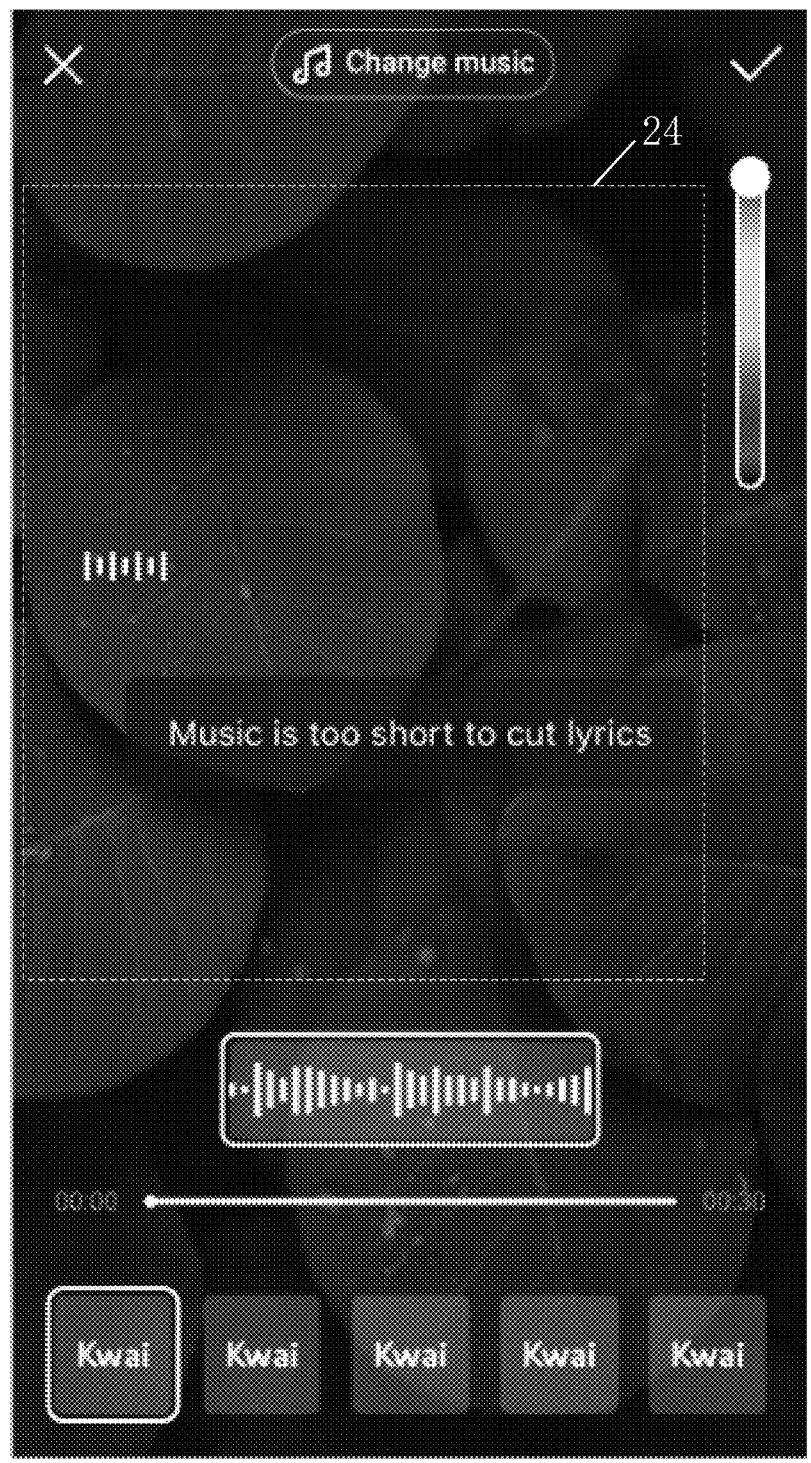
FIG. 4 is a schematic diagram illustrating a displaying manner of a first reminder message according to embodiments of the disclosure.

For example, as illustrated in FIG. 4, after the cutting operation fails, the first reminder message "music is too short to cut lyrics" can be generated and displayed in the lyric display area 24.

In some embodiments of the disclosure, to enable the user to accurately and intuitively observe the playback progress of the target music material, the playback progress of the target music material may be displayed. In some examples, the playback progress of the target music material may be determined and displayed in the audio display area based on a current playback time and the first playback duration of the target music material.

Figure 5:
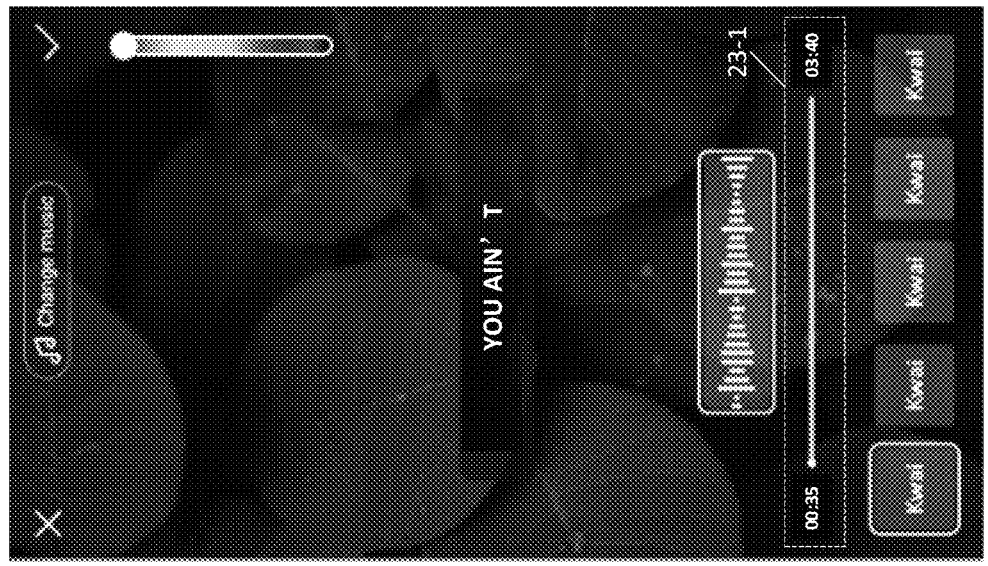
FIG. 5 is a schematic diagram illustrating a playback progress of a target music material according to embodiments of the disclosure.
Figure 5:
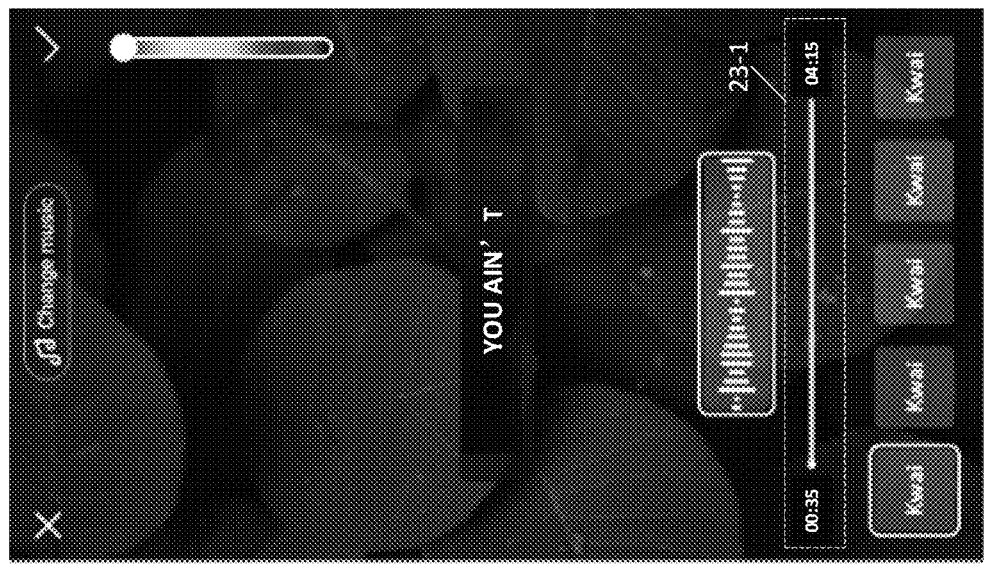

For example, as illustrated in FIG. 5(a), the current playback time of the target music material and the first playback duration of a source short video are displayed in the audio display area, where 00:35 is the current playback time of the target music material, and 04:15 is the first playback duration.

In some embodiments of the disclosure, after the first playback duration of the short video is obtained, a remaining playback duration of the source short video can be determined and displayed in the audio display area based on the current playback time and the first playback duration of the target music material.

For example, as illustrated in FIG. 5(b), the current playback time of the target music material and the remaining playback duration of the source short video are displayed in the audio display area, where 00:35 is the current playback time of the target music material, and 03:40 is the remaining playback duration of the source short video.

In the disclosure, a problem that the lyric sticker cannot be dynamically displayed in the short video with the target music material due to the mismatch between the playback duration of the target music material and the playback duration of the short video can be solved, and the user experience is improved.

It is to be noted that the target music material generally contains an intro. As a result, the lyrics do not appear from the beginning to the end of the music material. For example, the total playback duration of the target music material is 3 minutes, and an appearance duration of the lyrics is 2 minutes, starting from the $30^{th}$ second to the $30^{th}$ second of the $2^{nd}$ minute. In some cases, the target music material may have no lyrics. For example, the target music material is absolute music, or sound materials about animals and natural world. In the disclosure, for extracting the lyrics from the target music material, a segment without lyrics can be identified from the target music material. When it is identified that there is a segment without lyrics, a corresponding dynamic effect can be generated for the segment without lyrics. A technical problem of poor user experience due to the lack of lyrics display in the lyric display area when playing the segment without lyrics can be solved.

Figure 6:
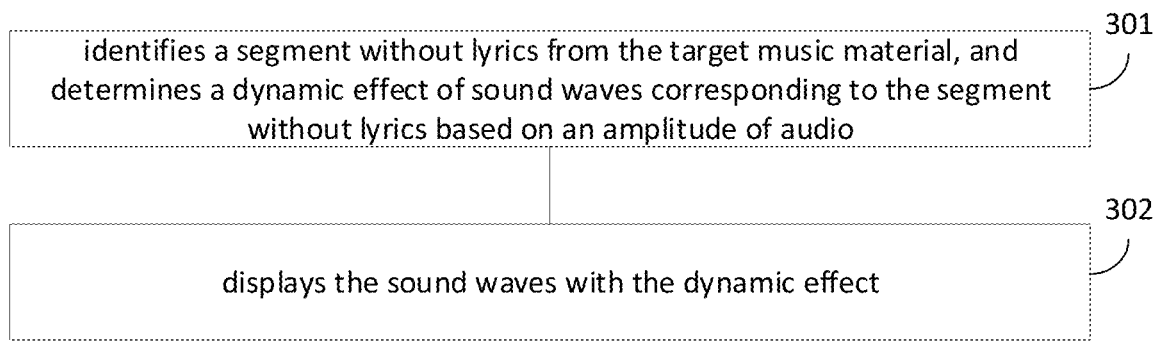
FIG. 6 is a flowchart illustrating a method for adding lyrics to a short video according to embodiments of the disclosure.

As a possible implementation, as illustrated in FIG. 6, based on the foregoing embodiments, extracting the lyrics from the target music material in 104 can include the following.

At 301, a segment without lyrics is identified from the target music material, and a dynamic effect of sound waves corresponding to the segment without lyrics is determined based on an amplitude of the audio.

In some examples, it can be determined whether the target music material includes the segment without lyrics.

The lyric is essentially a kind of voice information. Therefore, in embodiments of the disclosure, for determining whether the target music material includes the segment without lyrics, voice recognition of lyrics can be performed on the target music material to determine whether the target music material includes the segment without lyrics.

Further, when it is identified that the target music material includes the segment without lyrics, the dynamic effect of sound waves corresponding to the segment without lyrics can be determined based on the amplitude of the audio. When it is identified that the target music material does not include the segment without lyrics, the lyrics can be directly loaded and displayed in the lyric display area.

Since there are different amplitudes of the audio, to make the displayed sound waves vividly reflect the target music material, the dynamic effect of sound waves can change to follow different amplitudes of the audio.

At 302, the sound waves are displayed with the dynamic effect.

Figure 7:
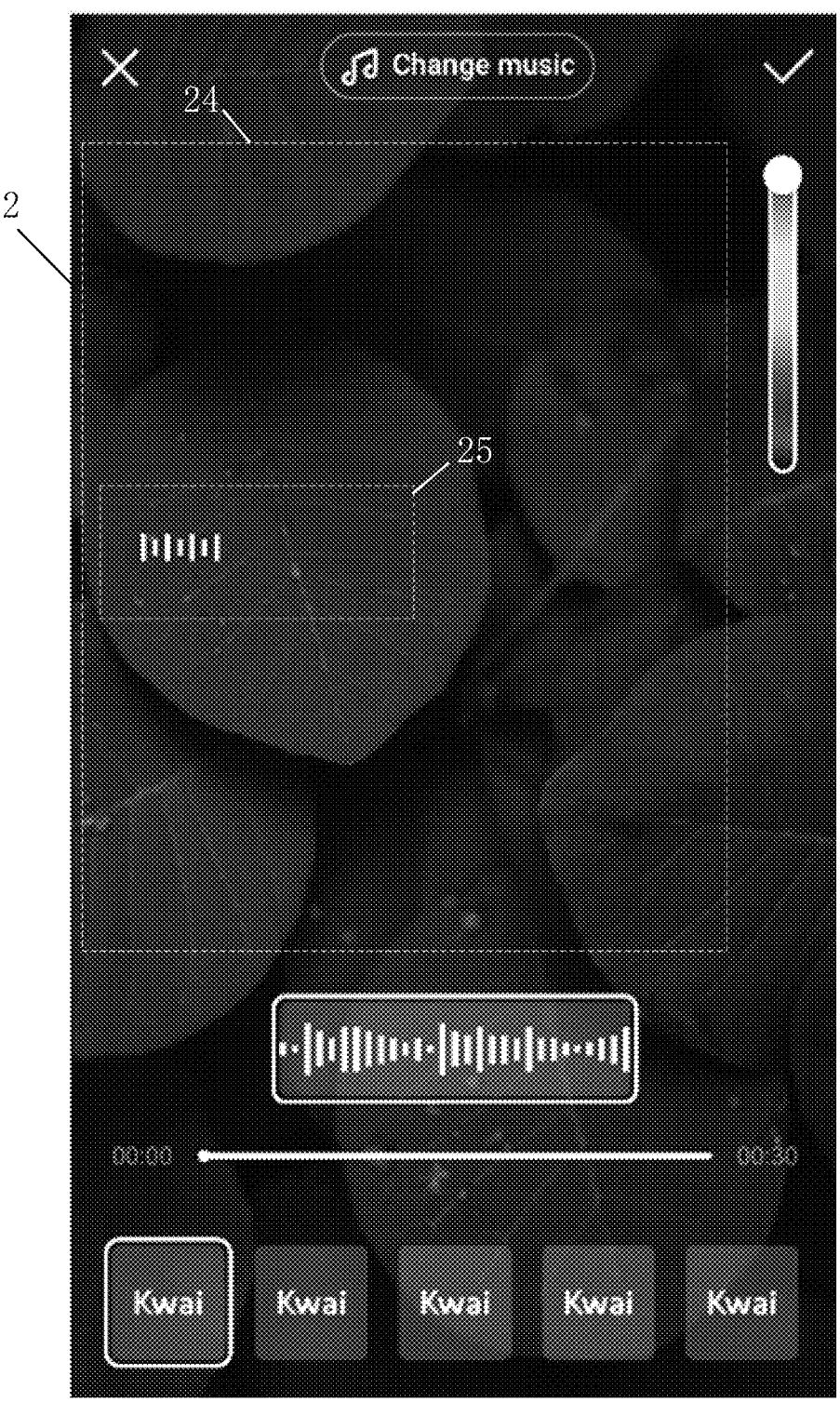
FIG. 7 is a schematic diagram illustrating a dynamic effect of sound waves of the lyrics according to embodiments of the disclosure.

For example, as illustrated in FIG. 7, the target music material is a piece of absolute music with a duration of 30 seconds. That is, it is identified that the target music material includes the segment without lyrics. In this case, the dynamic effect of the sound waves corresponding to the segment without lyrics can be determined based on the amplitude of the audio and the sound waves 25 are displayed with the dynamic effect.

It is to be noted that the lyrics and the sound waves cannot displayed simultaneously in the short video. That is, when there is no lyrics displayed, the sound waves are displayed. When there is the lyrics appear, no sound waves are displayed.

With the method for adding lyrics to a short video according to embodiments of the disclosure, by identifying the segment without lyrics in the target music material, and determining the dynamic effect of sound waves corresponding to the segment without lyrics based on the amplitude of the audio, the sound waves are displayed with the dynamic effect. When there is a segment without lyrics in the target music material, instead of the lyric sticker, the sound waves can be displayed with the dynamic effect in short video.

In some embodiments of the disclosure, black caused by the segment without lyrics can be reduced.

In some embodiments of the disclosure, poor visual experience due to the lack of lyric sticker is relieved as much as possible, and the user experience is improved.

In embodiments of the disclosure, the user can perform various editing operations on the target music material on a music editing page, such as color tuning, cutting, and word effect modifying. Therefore, in the disclosure, the target music material can be edited in response to an edition operation on the target music material on a music editing page.

The following explains the editing process of the target music material based on different editing requirements for different areas of the music editing page.

Figure 8:
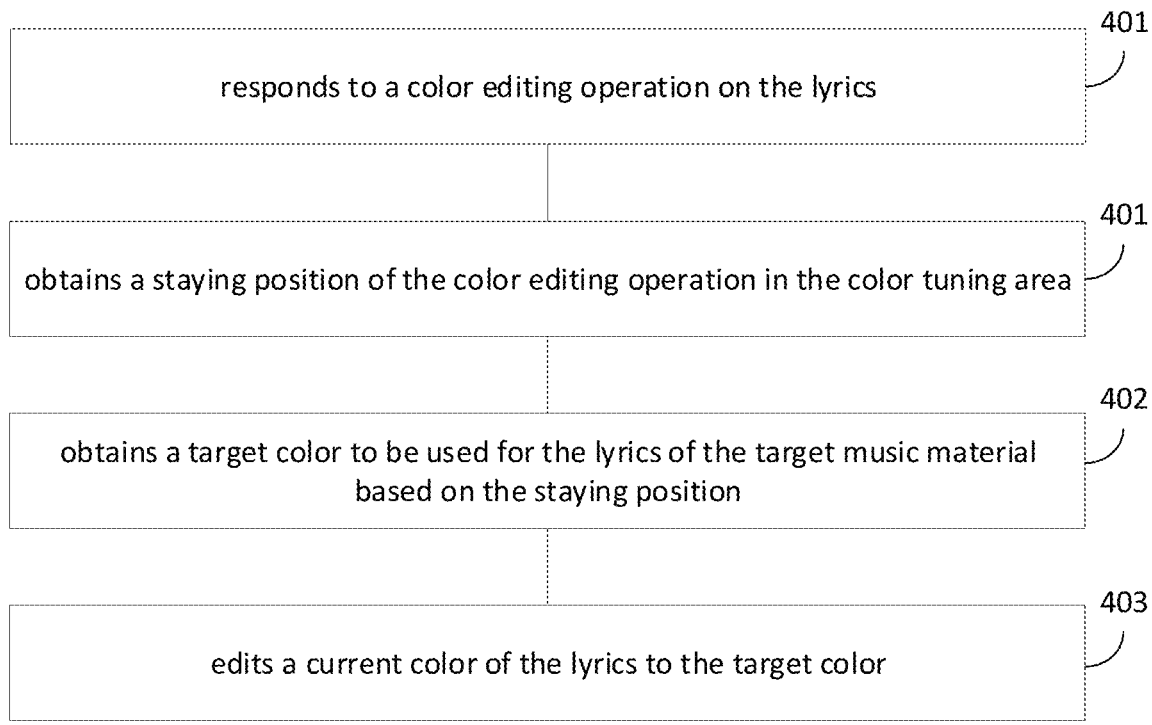
FIG. 8 is a flowchart illustrating a method for adding lyrics to a short video according to embodiments of the disclosure.

Regarding a color tuning area, in a possible implementation of the disclosure, editing the color of the lyrics in the target music material in response to a color editing operation on the target music material on the music editing page includes the following, as illustrated in FIG. 8.

At 401, a color editing operation on the lyrics is responded to.

At 402, a staying position of the color editing operation in a color tuning area is obtained.

In embodiments of the disclosure, the color tuning section is used to display candidate colors on the music editing interface. The color tuning area includes an outer frame and a filled area. The filled area includes multiple sub-areas. Each sub-area corresponds to a candidate color. The filled area is filled with color based on a correspondence between the sub-areas and the candidate colors.

The number of candidate colors in the color tuning area and the types of candidate colors can be set based on actual conditions. For example, the candidate colors can be red, orange, yellow, green, dark green, black, blue, purple, white, pink, gray, and brown, i.e., there are totally 12 candidate colors. In actual applications, a color can be preset as default. For example, the white color can be preset as the default color. In this case, when the target music material is loaded into the music editing page and displayed in the lyric display area, the lyrics can be displayed as white.

Figure 9:
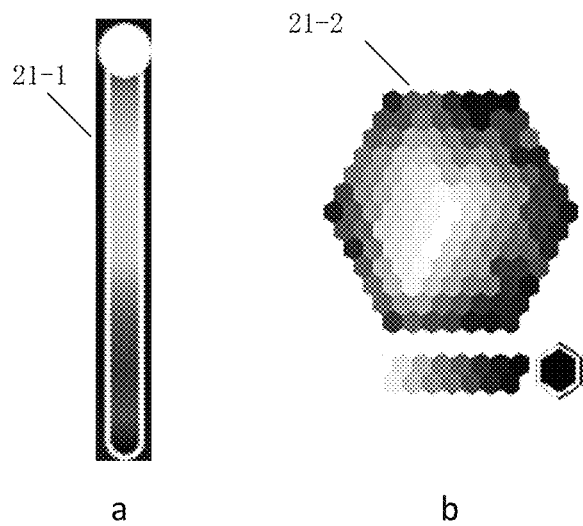
FIG. 9 is a schematic diagram illustrating a display manner of a color tuning area according to embodiments of the disclosure.

A display manner of the color tuning area can be set based on actual situations. As an example, the color tuning area can be a slider 21-1 as illustrated in FIG. 9(a). As another example, the color tuning area can be a color plate as illustrated in FIG. 9(b).

In some embodiments, the color editing operation in the color tuning area can be monitored. After it is monitored that there is a color editing operation, the staying position of the color editing operation on the color tuning area can be obtained. The staying position is a sub-area of the color tuning area.

At 403, the target color to be used for the lyrics of the target music material is obtained based on the staying position.

In some examples, after obtaining the staying position of the color editing operation in the color tuning area, a candidate color corresponding to the sub-area can be determined based on the sub-area where the staying position is located. The candidate color is determined as the target color used for the lyrics of the target music material.

At 404, a color of the lyrics is edited to the target color.

In some examples, after the target color is obtained, codes of the target color can be overwritten to the codes of the color used currently for the lyrics stored in the program to edit the color of the lyrics to the target color.

The target color can be represented by the Red Green Blue Color Mode (RGB color mode for short). For example, when the RGB color mode is (255, 255, 0), it means that the target color is yellow.

For example, the staying position of the color editing operation in the color tuning area is obtained, and the target color to be used for the lyrics of the target music material is obtained as (255, 255, 0), i.e., yellow, based on the staying position. The codes of the target color (255, 255, 0) can be overwritten to the codes of the default color (255, 255, 255) currently used and stored in the program to edit the default white color to the yellow color for the lyrics.

In embodiments of the disclosure, the lyrics can be displayed with different colors at different times.

In the disclosure, the user experience is improved, and the displayed color of the lyrics of the target music material is in line with user requirements.

For example, a current playback time of the target music material can be obtained, and a current color of the lyrics is edited to the target color starting from the current playback time to the ending of the playback of the target music material.

As an example, the target color is yellow. When the obtained current playback time of the target music material is $15^{th}$ second of the $2^{nd}$ minute, the current color of the lyrics can be edited to the yellow starting from the $15^{th}$ second of the $2^{nd}$ minute until the playback of the target music material ends.

It is to be noted that for editing the color of the lyrics, the color of the lyrics can be edited multiple times during the playback duration of the audio. That is, multiple target colors can be set for the lyrics separately at different playback times and a current target color is different from the previous one. For example, the current playback time of the target music material may be obtained, and the current color of the lyrics is edited to the target color starting from the current playback time to a playback time corresponding to a next target color or to the ending of the playback of the target music material.

As an example, when the target color is yellow, when the obtained current playback time of the target music material is the $15^{th}$ second of the $2^{nd}$ minute, the current color of the lyrics can be edited to the yellow color starting from the $15^{th}$ second of the $2^{nd}$ minute. Further, when obtaining the next target color, i.e., red, the current playback time of the target music material can be obtained again. It may be determined that the current playback time corresponding to the red color is the $55^{th}$ second of the $2^{nd}$ minute, the color of the lyrics can be edited from the yellow to red starting from the $55^{th}$ second of the $2^{nd}$ minute to the playback time corresponding to the next target color or until the playback of the target music material ends.

It is to be noted that users can perform various editing operations on the target music material on the music editing page. However, in actual applications, the area of the music editing page is limited, which makes when the editing operation stays on a certain position of the slider or the color plate, the user cannot intuitively and accurately know the currently selected target color.

In the disclosure, a floating window can be used to display enlarged target color.

Figure 10:
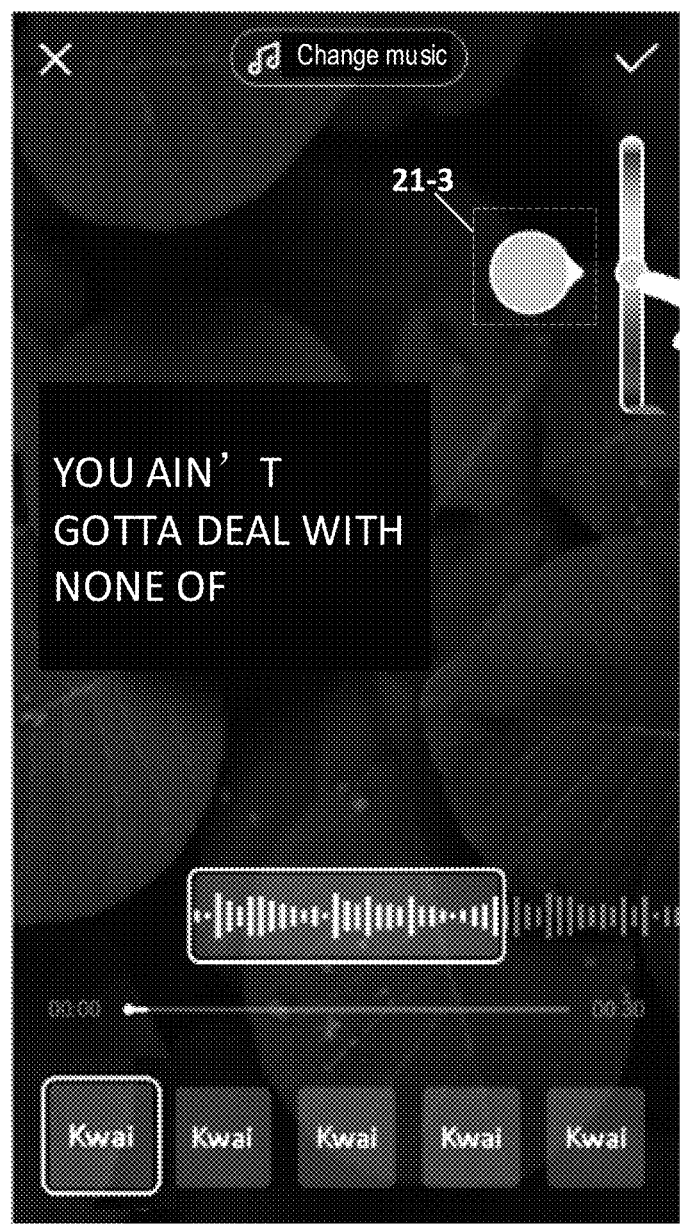
FIG. 10 is a schematic diagram illustrating a floating window according to embodiments of the disclosure.

For example, the floating window carrying the target color can be displayed at the staying position, where the floating window is used to display the target color by enlarging the area of the target color. As illustrated in FIG. 10, after the staying position of the color editing operation on the color tuning area 21 is obtained, the floating window 21-3 carrying the target color will be displayed at the staying position to enlarge the area of the target color and display the enlarged target color.

It is to be noted that a staying duration of the floating window can be the same as a staying duration of the color editing operation on the color tuning area. That is, when it is identified that the color editing operation stays on the color tuning area, the floating window is displayed. When it is identified that the color editing operation does not stay on the color tuning area, the floating window disappears.

Figure 11:
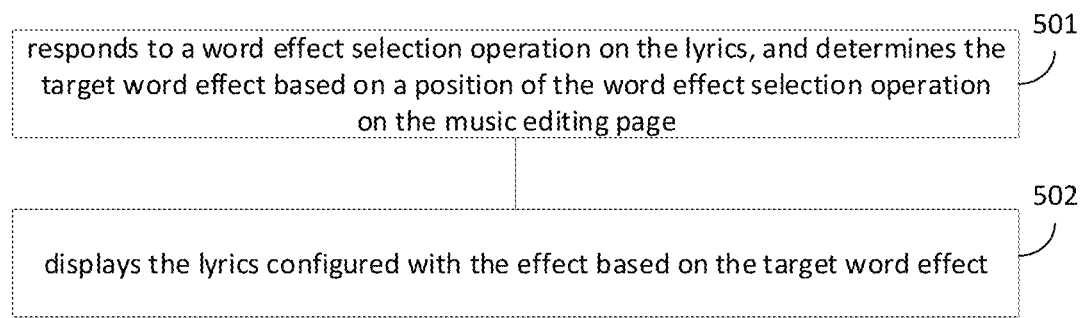
FIG. 11 is a flowchart illustrating a method for adding lyrics to a short video according to embodiments of the disclosure.

For a word effect area, in a possible implementation of embodiments of the disclosure, editing the target music material in response to the editing operation on the target music material on the music editing page includes the following, as illustrated in FIG. 11.

At 501, in response to a word effect selection operation of the lyrics, a selected target word effect is determined based on a position of the word effect selection operation on the music editing page.

In embodiments of the disclosure, a variety of preset words effects can be displayed in the word effect area. Types and the number of the word effects displayed in the word effect area can be set based on actual conditions.

Figure 12:
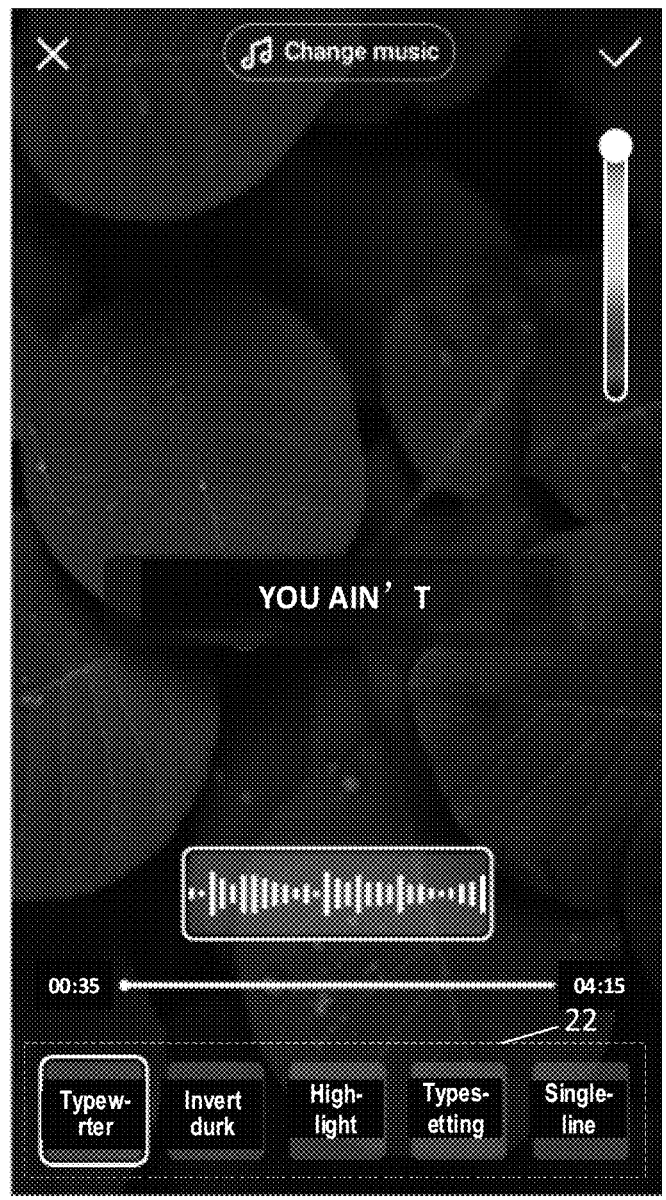
FIG. 12 is a schematic diagram illustrating a display manner of a word effect area according to embodiments of the disclosure.
Figure 13:
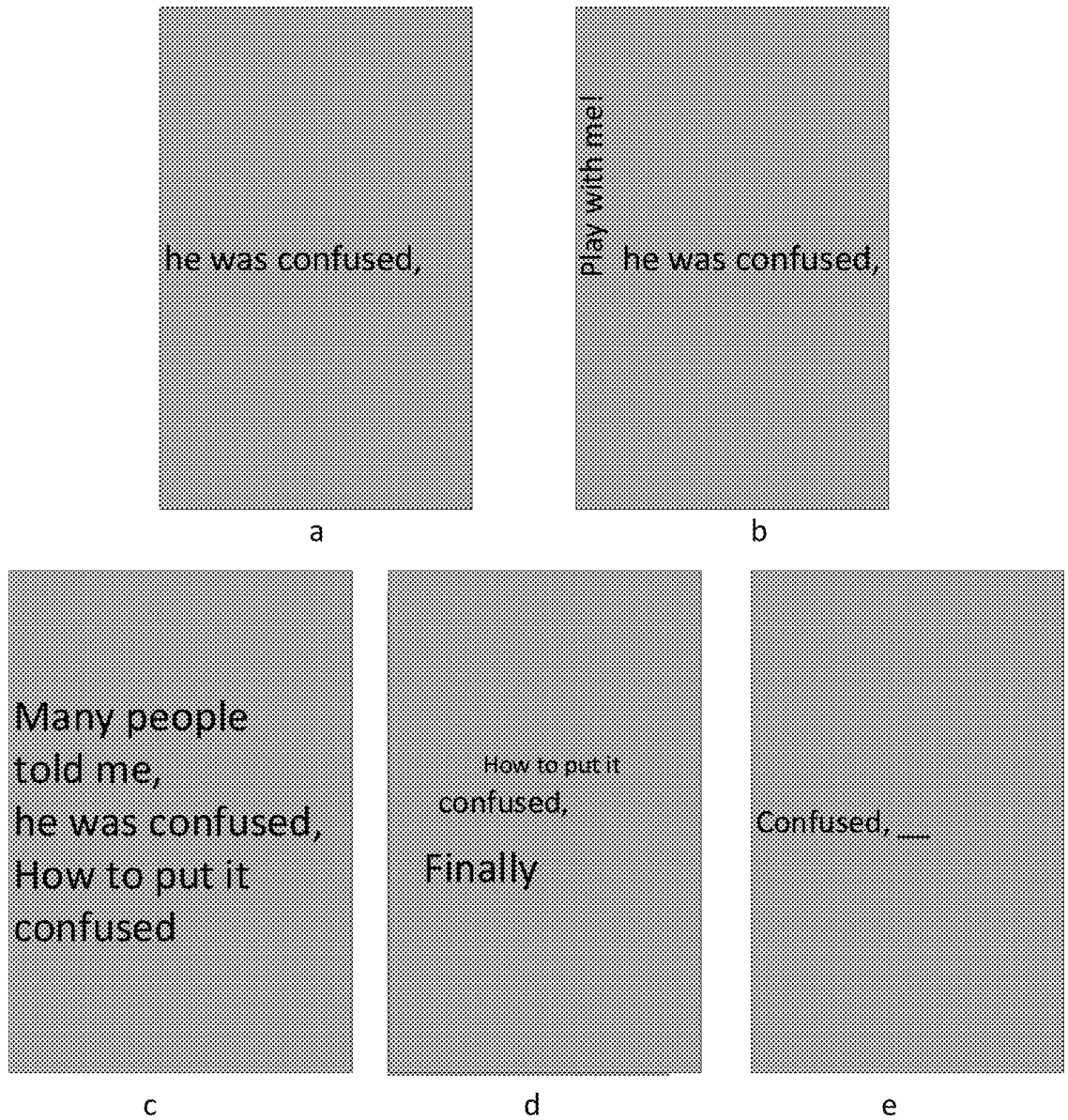
FIG. 13 is a schematic diagram illustrating a different word effect according to embodiments of the disclosure.

For example, as illustrated in FIG. 12, five types of word effects can be displayed, i.e., "typewriter", "invert duck", "highlight", "typesetting" and "single-line". The word effect of "single-line" is illustrated as FIG. 13(a). The word effect of "invert duck" is illustrated in FIG. 13(b). The word effect of "highlight" is illustrated in FIG. 13(c). The word effect of "typesetting" is illustrated in FIG. 13(d). The word effect of "typewriter" is illustrated in FIG. 13 (e). The word effect "single-line" is the default word effect.

For example, the word effect selection operation in the word effect area is monitored. The position of the word effect selection operation on the page is obtained. A mapping relationship between preset positions and candidate word effects is queried based on the position to determine the selected word effect and mark the selected word effect as the target work effect.

At 502, an effect of the lyrics is configured and displayed based on the target word effect.

In embodiments of the disclosure, different word effects can be set for the lyrics at different times.

In the disclosure, the user experience is improved and the displayed word effect of the lyrics of the target music material is in line with user requirements.

For example, a current playback time of the target music material can be obtained, and the effect of the lyrics can be configured based on the target word effect starting from the current playback time until the playback of the target music material ends.

As an example, when the target word effect is the "typewriter" and the obtained current playback time of the target music material is the $15^{th}$ second of the $2^{nd}$ minute, the current word effect of the lyrics is edited to the "typewriter" starting from the $15^{th}$ second of the $2^{nd}$ minute to the ending of the playback of the target music material.

It is to be noted that for editing the word effect of the lyrics, the word effect of the lyrics can be edited multiple times during the playback duration of the audio. That is, multiple target effects can be set for the lyrics at different times, and a current target word effect is different from the previous target word effect. For example, the current playback time of the target music material may be obtained. The current word effect of the lyrics is edited to the target word effect starting from the current playback time to a playback time corresponding to the next target word effect or until the playback of the target music material ends.

For example, when the target word effect is the "typewriter" and the obtained current playback time of the target music material is the $15^{th}$ second of the $2^{nd}$ minute, the current word effect of the lyrics is edited to the word effect of "typewriter" starting from the $15^{th}$ second of the $2^{nd}$ minute. Further, when it is obtained that the next target word effect is the word effect of "typesetting", the current playback time of the target music material can be obtained again. It is determined that the current playback time is the $55^{th}$ second of the $2^{nd}$ minute. The word effect of "typewriter" of the lyrics can be edited to the word effect of "typesetting" starting from the $55^{th}$ second of the $2^{nd}$ minute to a playback time corresponding to the next target word effect or until the playback of the target music material playback ends.

In embodiments of the disclosure, the position of the lyrics in the lyric display area can be adjusted.

Figure 14:
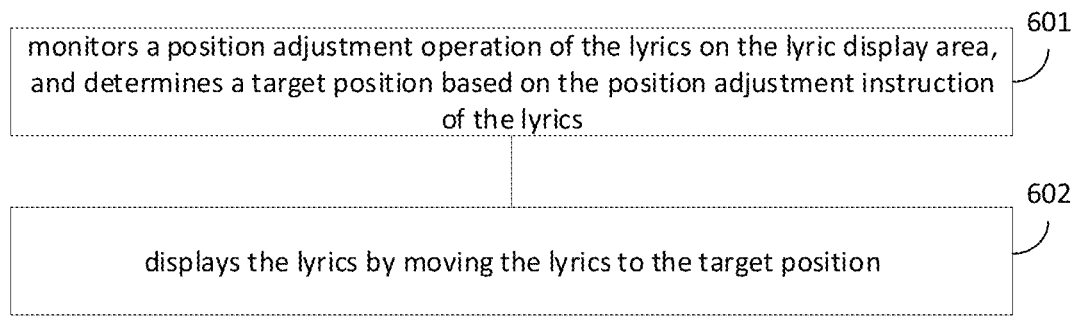
FIG. 14 is a flowchart illustrating a method for adding lyrics to a short video according to embodiments of the disclosure.

In the disclosure, occlusion of the short video by the displayed lyrics can be obtained and the display position of the lyrics is in line with user requirements, In a possible implementation of embodiments of the disclosure, the above method for adding lyrics to a short video can include the following, as illustrated in FIG. 14.

At 601, a position adjustment operation of the lyrics in the lyric display area is monitored, and a target position of the lyrics is determined based on the position adjustment operation.

At 602, the lyrics are displayed after moving to the target position.

Figure 15:
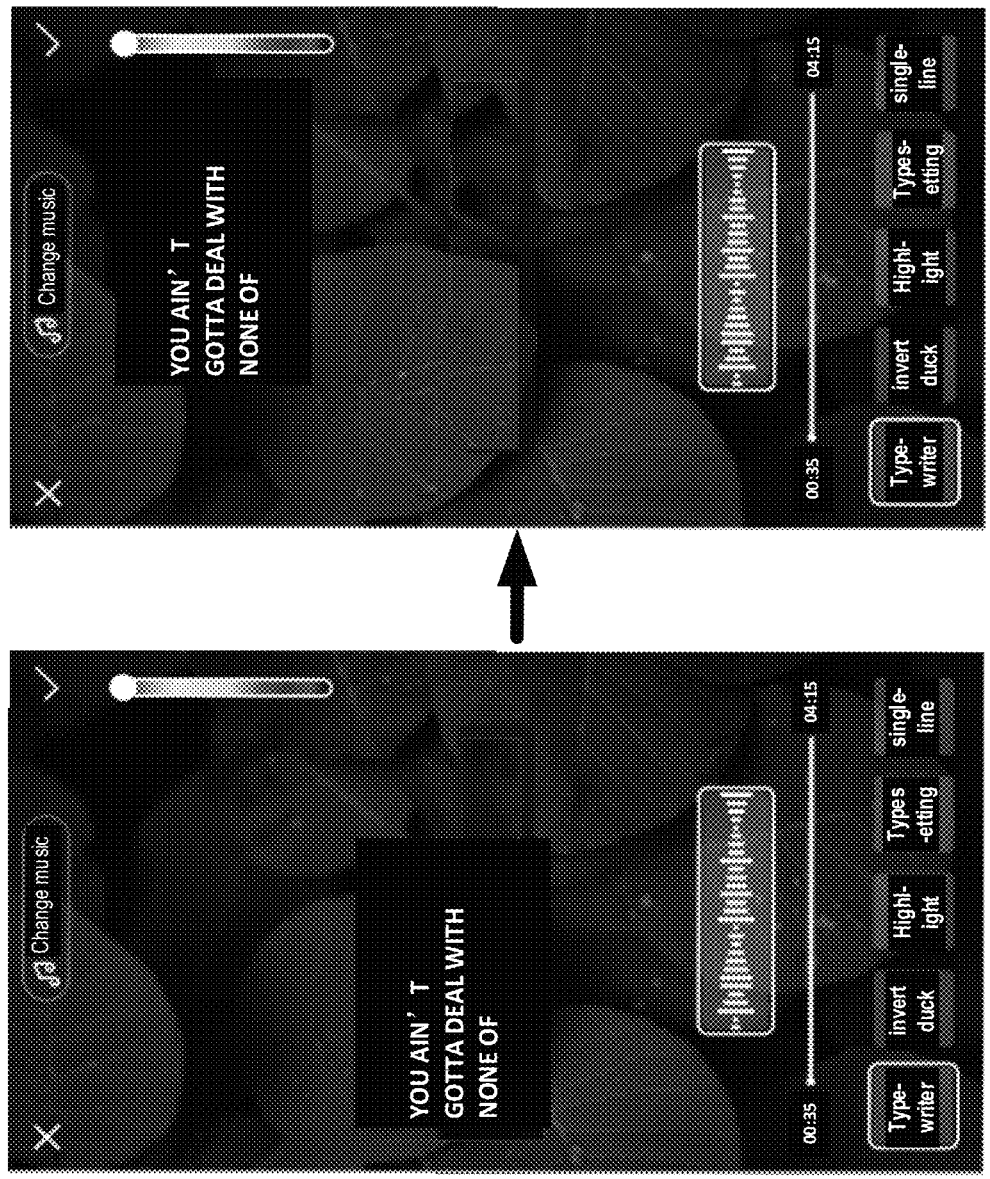
FIG. 15 is a schematic diagram of adjusting a position of lyrics according to embodiments of the disclosure.

For example, after it is monitored that there is the position adjustment operation of the lyrics, the lyrics can be moved from the current position illustrated in FIG. 15(a) to the target position illustrated in FIG. 15(b) for display.

In some embodiments of the disclosure, the font size of the lyrics in the lyric display area can be adjusted.

In the disclosure, the font size of the lyrics can match the content of the short video and user requirements can be met.

For example, a scaling operation of the lyrics in the lyric display area can be monitored, and the font size of the lyrics can be enlarged or reduced based on the scaling operation.

Figure 16:
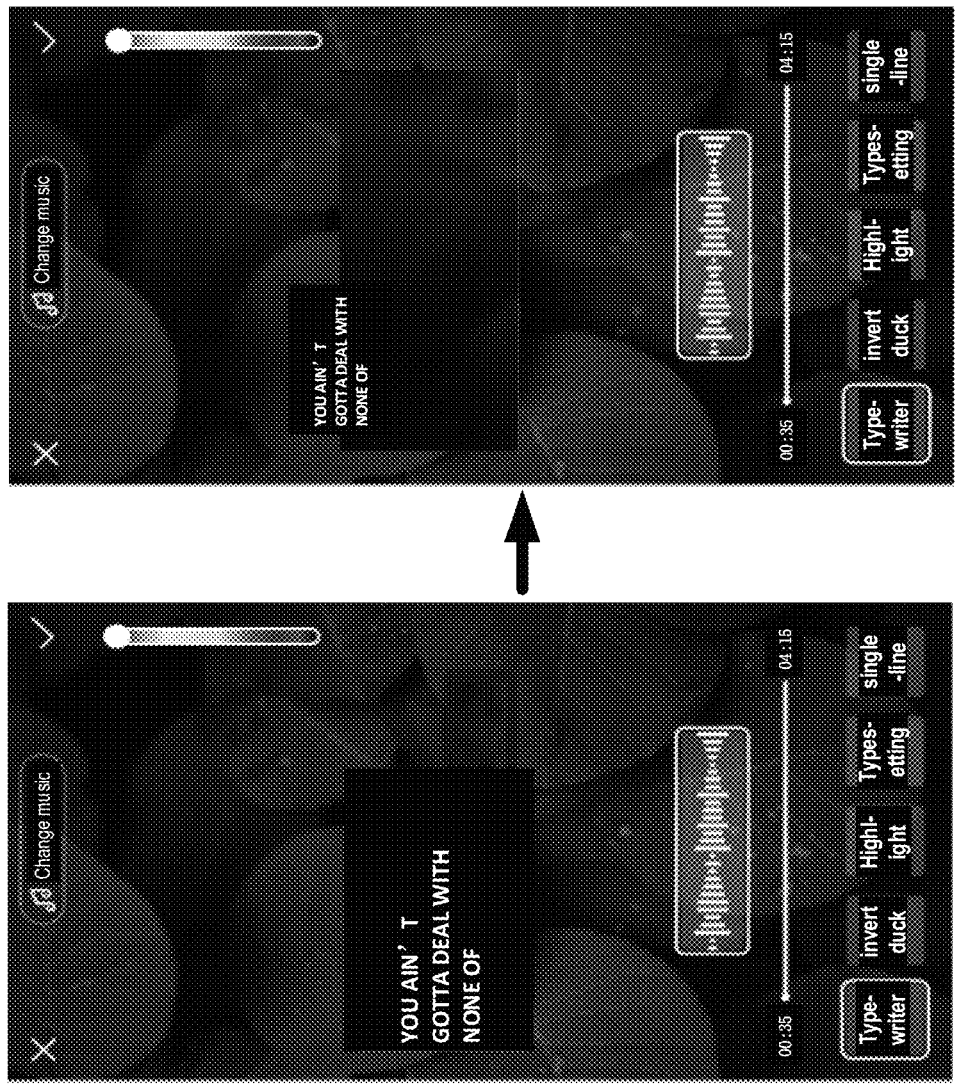
FIG. 16 is a schematic diagram of adjusting a font size of lyrics according to embodiments of the disclosure.

As an example, after it is monitored that there is the scaling operation of the lyrics, the lyrics can be scaling from the current font size illustrated in FIG. 16(a) to the font size illustrated in FIG. 16(b).

In practical applications, the user needs to edit the lyrics several times to satisfy his requirement. In the disclosure, the lyrics can be removed from the lyric display area. A duration of a dragging operation can be identified before the lyrics are removed.

In the disclosure, mistakenly removing the lyrics can be avoided.

Figure 17:
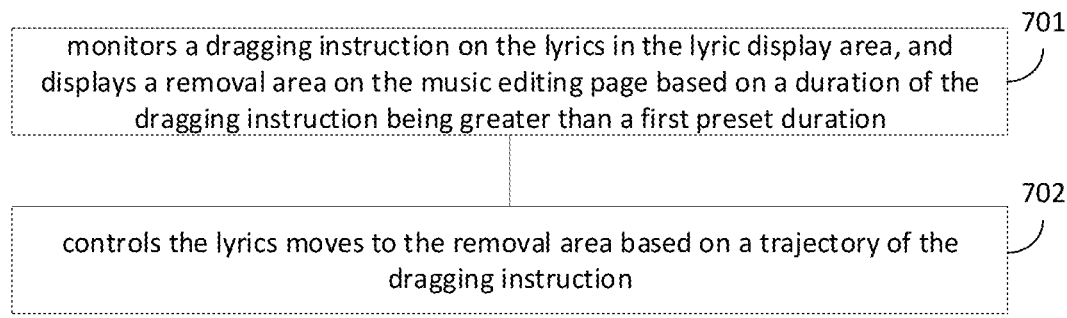
FIG. 17 is a flowchart illustrating a method for adding lyrics to a short video according to embodiments of the disclosure.

In a possible implementation of embodiments of the disclosure, the above method for adding lyrics to a short video can include the following, as illustrated in FIG. 17.

At 701, a dragging operation of the lyrics is monitored in the lyric display area, and a removal area is displayed on the music editing page based on a duration of the dragging operation being greater than a first preset duration.

At 702, the lyrics are moved to the removal area based on a trajectory of the dragging operation.

In embodiments of the disclosure, after the dragging operation of the lyrics is monitored in the lyric display area, the duration of the dragging operation is compared with the first preset duration. When the duration of the dragging operation is greater than the first preset duration, the removal area is displayed on the music editing page and the lyrics are controlled to move to the removal area based on the trajectory of the dragging operation. When the duration of the dragging operation is less than or equal to the first preset duration, the dragging operation is ignored and the lyrics are controlled to return to a position prior to the dragging operation.

Figure 18:
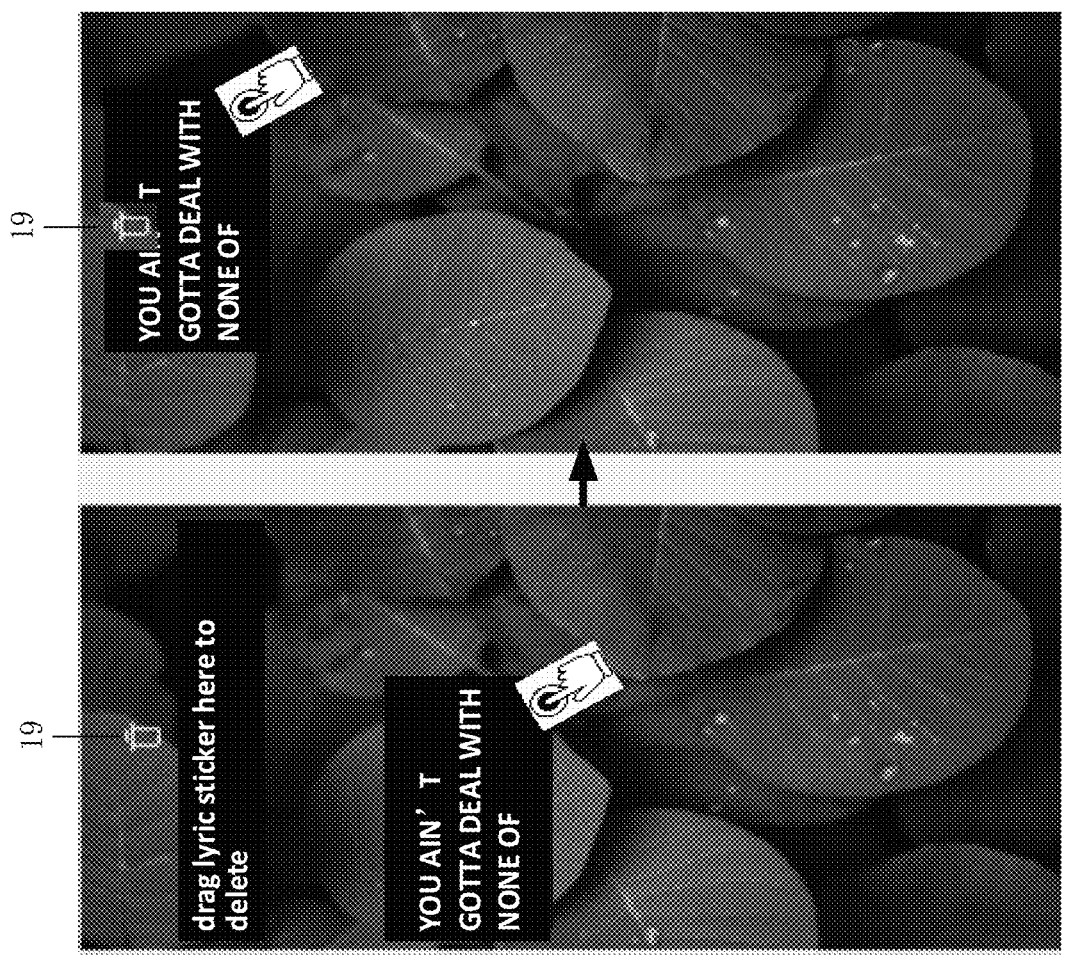
FIG. 18 is a schematic diagram of removing lyrics according to embodiments of the disclosure.

As an example, after monitoring that there is the dragging operation of the lyrics and identifying that the duration of the dragging operation is greater than the first preset duration, as illustrated in FIG. 18, the removal area 19 is displayed on the music editing page, and the lyrics are controlled to follow the trajectory of the dragging operation to move to the removal area.

It is to be noted that after the lyrics are deleting by moving to the removal area, the audio of the target music material is still reserved.

In embodiments of the disclosure, when the user is not satisfied with the currently selected target music material and tries to reselect another target music material, the user can trigger an entry control and a first display page is displayed for reselecting the target music material. The entry control is set on the music editing page.

Figure 19:
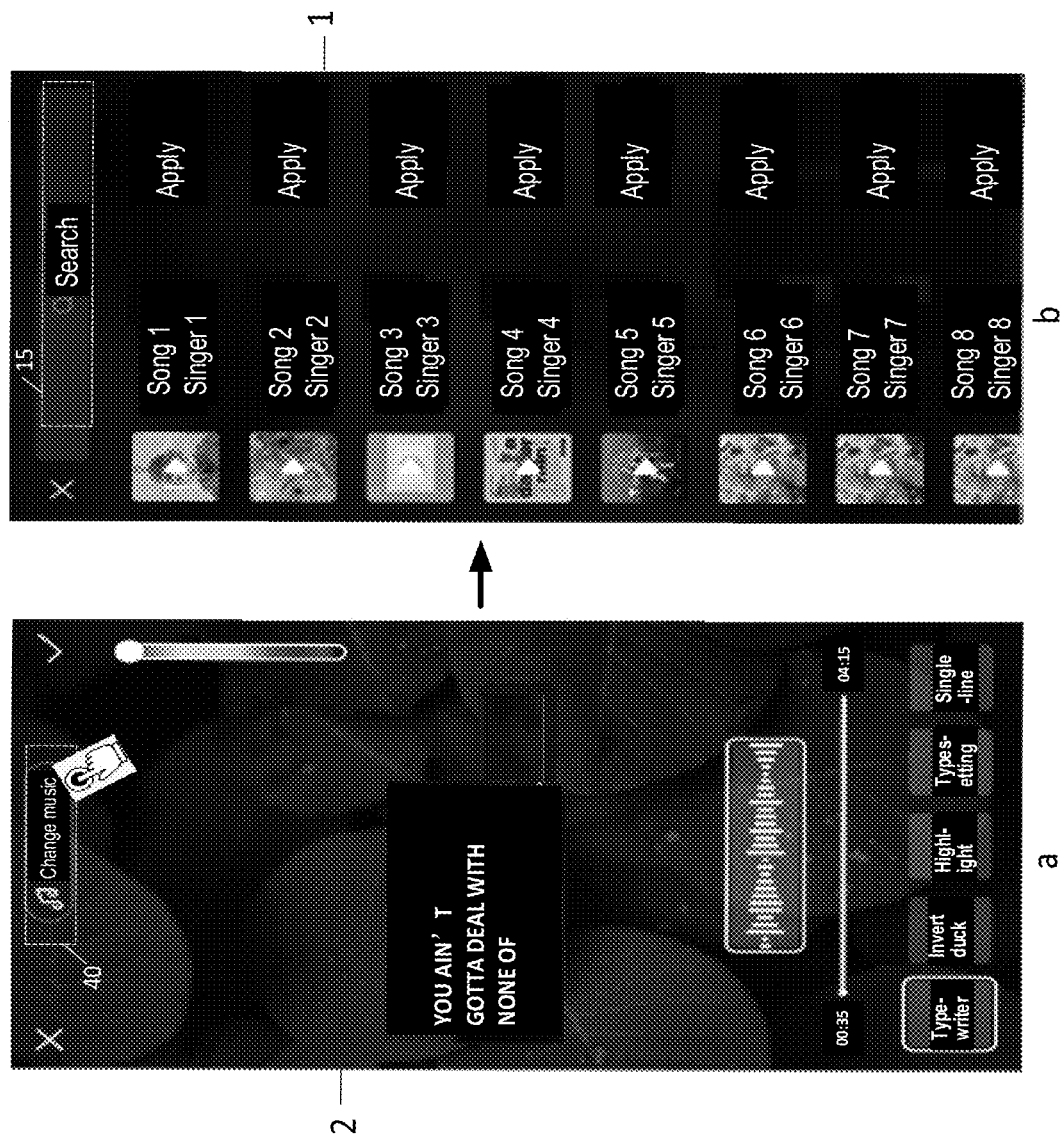
FIG. 19 is a schematic diagram illustrating an entry control according to embodiments of the disclosure.

For example, as illustrated in FIG. 19, the "Change music" on the music editing page is the entry control 40. In response to a triggering operation on the entry control 40 of "Change music", the music editing page 2 jumps to the first display page 1.

In the disclosure, the interaction scheme is simplified.

After the source short video is obtained, the first display page can be directly called, and the target operation can be monitored on the first display page. After monitoring that there is the target operation, the first display page is switched directly to the music editing page, to edit the target music material to obtain the target short video.

In the disclosure, the number of interactions is reduced, the operation time is shortened, and the cost of learning is reduced, which improves the user experience.

Further, in the disclosure, the color tuning area, the word effect area, the audio display area, and lyric display area are all displayed on the music editing page.

After jumping to the music editing page, the user can intuitively edit the target music material, making the user operation smooth and convenient, reducing the cost of learning for users and improving the user experience.

Figure 20:
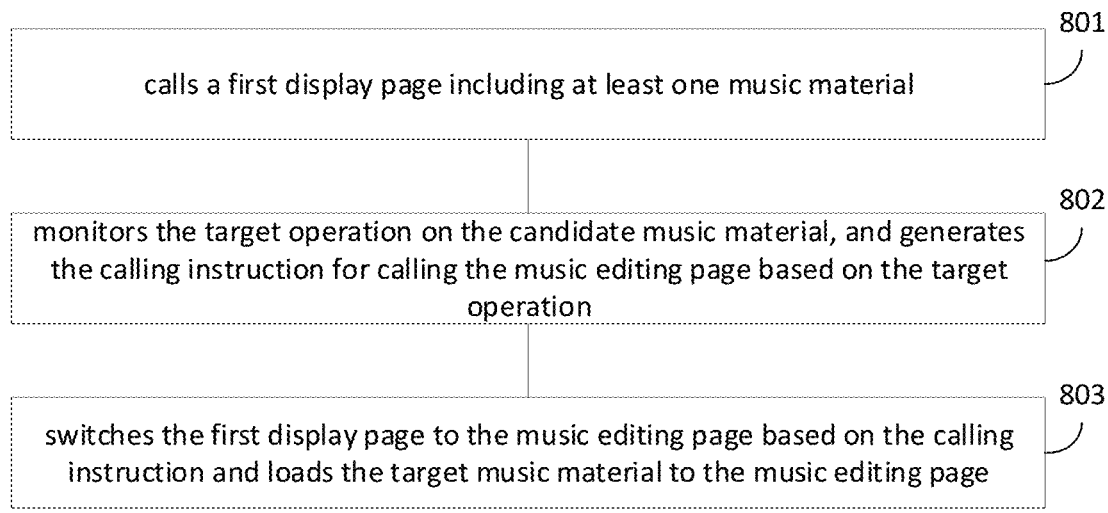
FIG. 20 is a flowchart illustrating a method for adding lyrics to a short video according to embodiments of the disclosure.

FIG. 20 is a flowchart illustrating a method for adding lyrics to a short video according to embodiments of the disclosure. As illustrated in FIG. 20, the method for adding lyrics to a short video according to embodiments can include the following.

At 801, a first display page including at least one music material is called.

For example, the stored video can be retrieved from a local video library, a remote video library, an image library, both the local video library and the remote video library, both the local video library and the image library, both the remote video library and the image library, or all of the local video library and the remote video library and the image library. In an example, after a local video is retrieved, the first display page can be called. In another example, the video can be directly recorded and the first display page is called after recording the video.

It is to be noted that after the video is obtained in the above manner, it can be determined whether the obtained video meets a processing condition. When the duration of the video is less than or equal to the preset duration, the processing condition is met and the first display page can be called. When the duration of the video is greater than the preset duration, the processing condition is not met, the video is cut to obtain a video clip such that the duration of the video clip is less than or equal to the preset duration, and the first display page is called. The preset duration can be set based on actual situations. For example, the preset duration is 5 minutes or 60 seconds.

In embodiments of the disclosure, the short video can be obtained, and the first display page is called after the short video is obtained. For example, the first display page can be called by clicking a "Next" button or by clicking a "recording" button after a previous recording is finished. The first display page includes at least one music material.

Figure 21:
FIG. 21 is a schematic diagram illustrating a first display page according to embodiments of the disclosure.

For example, after a source short video is obtained, the first display page 1 illustrated as FIG. 21 can be called. The first display page includes multiple music materials 14, a searching box 15, related controls 11 and 12, a display box 16 of song information, and a display box 17 of a song cover.

At 802, a target operation of the candidate music material is monitored, and a calling instruction for calling the music editing page is generated based on the target operation.

In embodiments of the disclosure, the target operation can be set for the first display page in advance, and the calling instruction for calling the music editing page can be generated through the target operation. As an example, a control A on the first display page can be configured in advance, and a certain operation of the control A can be defined as the target operation. As another example, a certain user operation on the first display page can be configured and defined as the target operation.

For example, the user can perform various operations on the first display page. In embodiments of the disclosure, it can be identified whether the user operation is the target operation. When it is monitored that a control on which the user operation is performed is the control A and the user operation is a certain operation (such as a clicking operation on the control A), it means that the user operation is the target operation. Therefore, the calling instruction for calling the music editing page is generated based on the target operation.

At 803, the first display page jumps to the music editing page based on the calling instruction, and the music material is loaded to the music editing page.

The calling instruction refers to an instruction for calling the music editing page. In some examples, for calling the music editing page, the calling instruction carries an identifier of the music editing page, and the music editing page is called by calling a function to enable the program to execute a code segment of the music editing page.

As another possible implementation, for calling the music editing page, the position of the target operation can be obtained, and the target material can be determined and cached based on the position of the target operation. The music editing page can be called by reading the cache.

It is to be noted that, for loading the target music material to the music editing page, the aforementioned calling instruction also carries an identifier of the target music material, to obtain the data of the target music material and load the data of the target music material to the music editing page. For example, the target music material corresponding to the staying position can be determined based on the staying position of the target operation and a correspondence between the staying positions and the page elements. The identifier of the target music material is carried in the calling instruction. The target music material can be a locally cached music material, or a music material pulled from the background.

Figure 22:
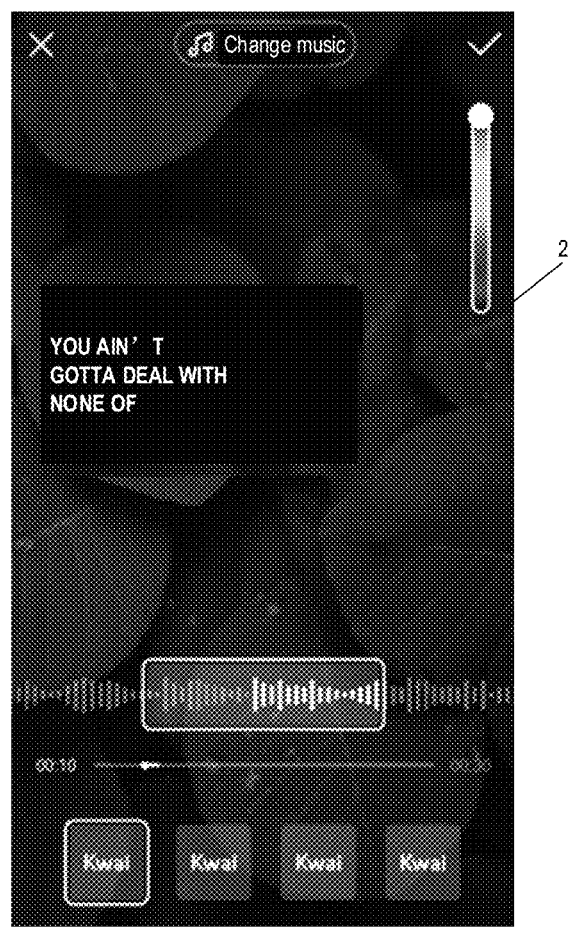
FIG. 22 is a schematic diagram illustrating a music editing page according to embodiments of the disclosure.

For example, after monitoring that there is a target operation performed on the music material "Song 1", a calling instruction for calling the music editing page 2 can be automatically generated. In this case, the first display page 1 is switched to the music editing page 2 illustrated as FIG. 22 based on the calling instruction, and the music material "Song 1" is loaded into the music editing page 2.

Further, after switching to the music editing page, the user can edit the target music material on the music editing interface. The music material generally includes lyrics and audio, such that the audio and the lyrics can be edited separately. For example, the word effect and the color of the lyrics, or length of the audio can be edited. Further, to enable the edited target music material to be displayed in the short video, the edited target music material may be loaded into the source short video to obtain the target short video.

In a process of loading the edited target music material to the source short video, the image frames, the lyrics, the playback time of the audio and other related data of the target music material need to be synchronized with each other, such that in the target short video, the edited target music material is displayed synchronously with the source short video.

Figure 23:
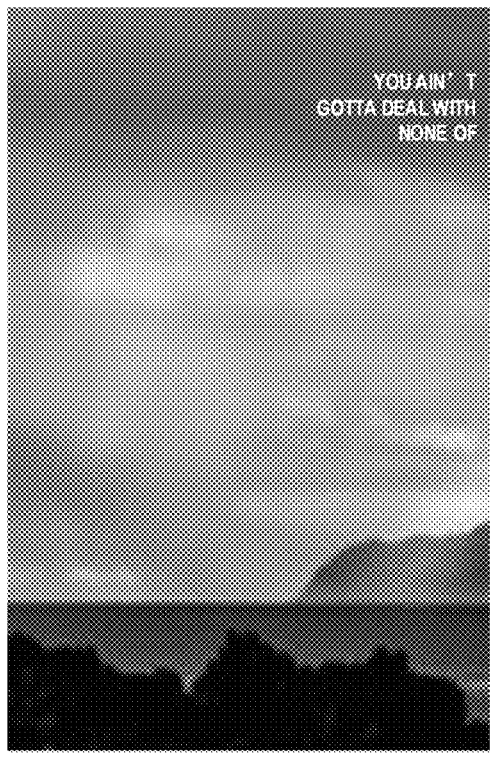
FIG. 23 is a schematic diagram illustrating a shooting page in a target short video according to embodiments of the disclosure.

For example, as illustrated in FIG. 23, in response to the editing operation of the user on the lyrics of the target music material "— Song 1", the edited music material is obtained, and the edited music material is loaded into the source short video to generate the target short video. FIG. 23 is a schematic diagram illustrating a playback page of the target short video, where the user edits the word effect, the color, and the staying position of the lyrics.

In the disclosure, the interaction scheme is simplified.

The first display page is directly called and the target operation on the first display page is monitored after the source short video is obtained. The first display page is directly switched to the music editing page to edit the target music material after it is monitored that there is the target operation.

In the disclosure, the number of interactions is reduced, the operation time is shortened, the cost of learning is reduced, and the user experience is improved.

In embodiments of the disclosure, since various controls such as selection controls and playback controls, and at least one music material are provided on the first display page, different settings of the target operation can be set in advance allow the user to generate the calling instruction for calling the music editing page in one or more ways.

As a possible implementation, the target operation can be set as a clicking operation on an arranging position of the selection control.

In some examples, the clicking operation on the arranging position of the selection control of the music material can be monitored. After it is monitored that there is the clicking operation on the arranging position of the selection control, the calling instruction is generated based on the clicking operation on the arranging position of the selection control.

Figure 24:
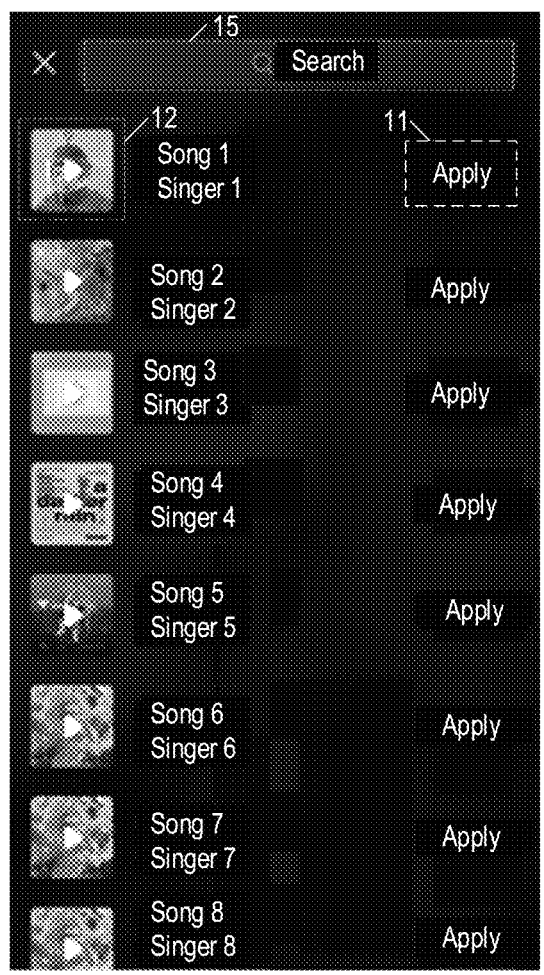
FIG. 24 is a schematic diagram illustrating controls on a first display page according to embodiments of the disclosure.

For example, in the first display page 1 illustrated in FIG. 24, the "apply" button is the selection control 11. When it is monitoring that there is a clicking operation on the arranging position of the "apply" button of the music material "Song 1", the calling instruction is generated based on the clicking operation on the arranging position of the "apply" button.

It is to be noted that in practical applications, before the user selects the target music material, he may also be interested in other music materials at the same time. Therefore, a collecting operation of music materials can be monitored in the disclosure, and a collecting instruction is generated based on the monitored collecting operation.

Figure 25:
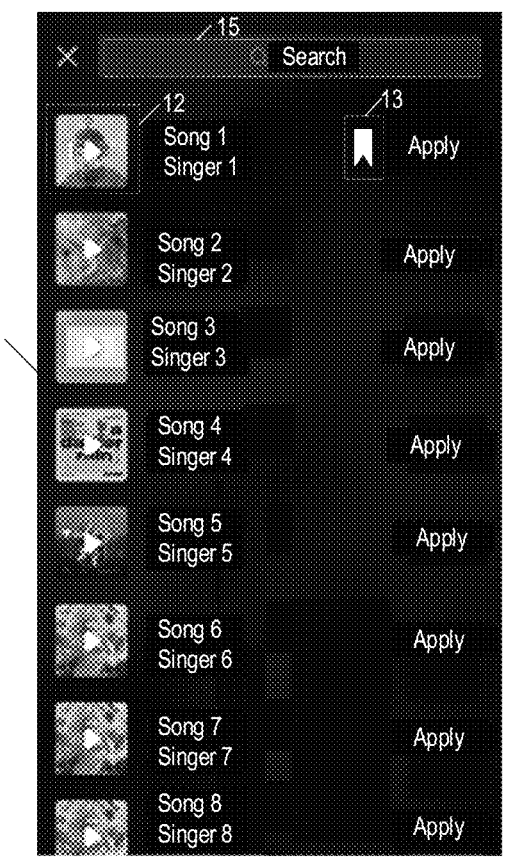
FIG. 25 is a schematic diagram illustrating a favorites icon on a first display page according to embodiments of the disclosure.

In some examples, as illustrated in FIG. 24, the clicking operation on the arranging position of a playback control 12 of the music material can be monitored. After it is monitored that there is the clicking operation on the arranging position of the playback control 12, as illustrated in FIG. 25, a favorites icon 13 of the music material is displayed on the first display page. The displayed favorites icon of the music material corresponds to the clicked music material one-to-one.

For example, as illustrated in FIG. 25, after monitoring that there is the clicking operation on the arranging position of the playback control 12, the favorites icon 13 of the music material can be displayed behind the music material "Song 1" on the first display page 1.

As another possible implementation, the target operation can be set as a clicking operation on the arranging position of the playback control 12.

The arranging position of the playback control can be set based on actual situations. As an example, as illustrated in FIG. 21, the playback control can be arranged in a display box of the song cover. As another example, the playback control can be arranged in the display box of the song information.

In the disclosure, the occupied area of the playback control on the first display page is saved, and the first display page is concise and clear. In addition, the learning cost of the user can be reduced, and the user experience can be improved.

In some examples, the clicking operation on the arranging position of the playback control 12 of the music material can be monitored. After it is monitored that there is the clicking operation on the arranging position of the playback control 12, a calling instruction is generated based on the clicking operation on the arranging position of the playback control 12.

For example, in the first display page 1 illustrated in FIG. 21, the display box of the song cover is the playback control 12. When it is monitored that there is the clicking operation on the arranging position in the display box of the song cover, the calling instruction is generated based on the clicking instruction on the arranging position in the display box of the song cover.

As another possible implementation, the target operation can be set as a double-clicking operation, a long-pressing operation, or a sliding operation on the music material.

In some examples, the double-clicking operation, the long-pressing operation and the sliding operation on the music material can be monitored. After monitoring that there is the double-clicking operation, the long-pressing operation, or the sliding operation, a calling instruction is generated based on the double-clicking operation, the long-pressing operation or the sliding operation.

For example, in the first display page 1 illustrated in FIG. 21, the double-clicking operation, the long-pressing operation or the sliding operation in the display box 16 of the song information can be monitored. When it is monitored that there is the double-clicking operation, the long-pressing operation or the sliding operation, the calling instruction is generated based on the double-clicking operation, the long-pressing operation or the sliding operation.

With the method for processing a short video according to embodiments of the disclosure, setting different target operations in advance can allow the user to generate a calling instruction for calling the music editing page in one or more ways.

Figure 26:
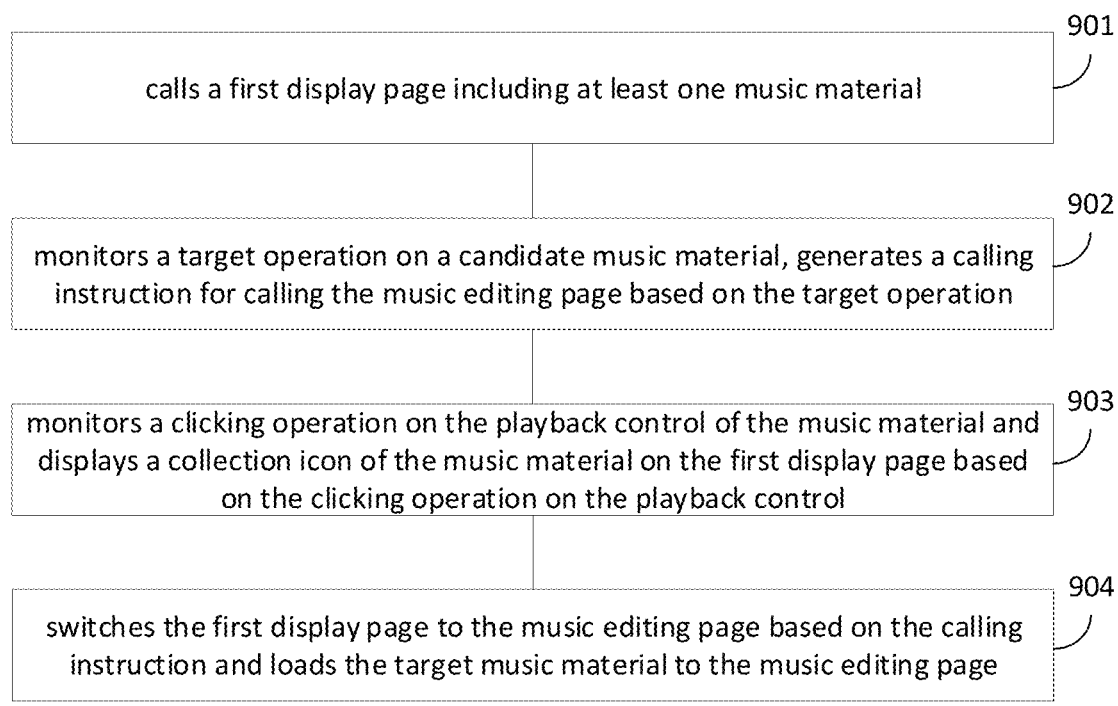
FIG. 26 is a flowchart illustrating a method for adding lyrics to a short video according to embodiments of the disclosure.

FIG. 26 is a flowchart illustrating a method for adding lyrics to a short video according to embodiments of the disclosure. As illustrated in FIG. 26, the method for adding lyrics to a short video according to the disclosure includes the following.

At 901, a first display page including at least one music material is called.

At 902, a target operation on a candidate music material is monitored, and a calling instruction for calling a music editing page is generated based on the target operation when monitoring that there is the target operation.

At 903, the clicking operation on the playback control of the music material is monitored. The favorites icon of the music material is displayed on the first display page based on the clicking operation of the playback control when monitoring that there is the clicking operation.

It is to be noted that introduction of blocks 901 to 903 can be seen those of blocks 801 and 802, which are not repeated here.

At 904, the first display page is switched to the music editing page based on the calling instruction, and the target music material is loaded on the music editing page.

Figure 27:
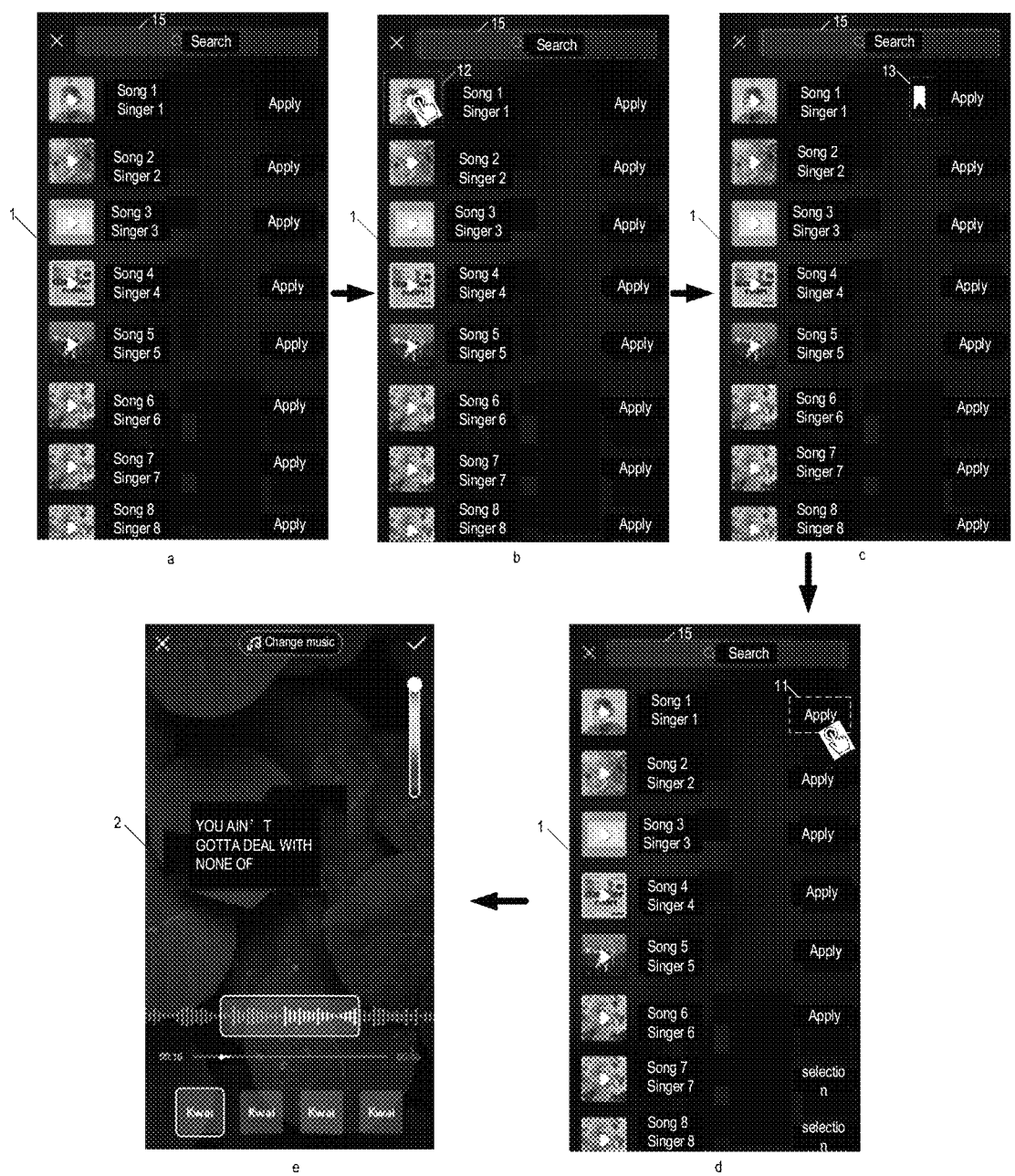
FIG. 27 is a schematic diagram illustrating a gradual process of adding lyrics to a short video according to embodiments of the disclosure.

In embodiments of the disclosure, as illustrated in FIG. 27, the process from obtaining the source short video to switching to the music editing page is as follows. As illustrated in FIG. 27(a), after obtaining the source short video, the first display page 1 is called. As illustrated in FIG. 27(b), it is monitored that there is the clicking operation of the user on the arranging position of the playback control 12 on the first display page 1. As illustrated in FIG. 27(c), the favorites icon 13 is displayed on the first display page 1 based on the clicking operation on the playback control 12. As illustrated in FIG. 27(d), it is monitored that there is a clicking operation of the user on the arranging position of the selection control 11 on the first display page 1. As illustrated in FIG. 27(e), the calling instruction is generated based on the clicking operation on the selection control 11. The first display page 1 is switched to the music editing page 2 based on the calling instruction. Therefore, after switching to the music editing page, the target music material can be loaded on the music editing page.

In embodiments of the disclosure, the user can perform various editing operations such as color toning, cutting, and word effect modifying on the target music on the music editing page. Therefore, in the disclosure, the target music material can be edited in response to an editing operation on the target music material on the music editing page.

Figure 28:
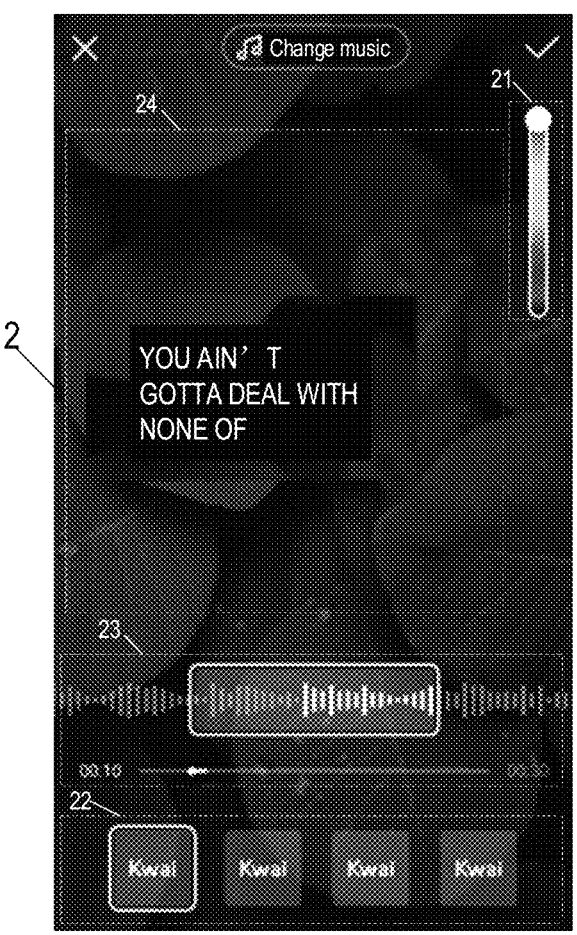
FIG. 28 is a schematic diagram illustrating a layout of functional areas of a music editing page according to embodiments of the disclosure.

In embodiments of the disclosure, as illustrated in FIG. 28, the music editing page 2 includes: a color tuning area 21, a word effect area 22, an audio display area 23 and a lyric display area 24. The placement positions of the aforementioned areas can be adjusted based on actual situations. For example, as illustrated in FIG. 28, the color tuning area 21 is placed at the upper right of the music editing page, the lyric display area 24 is placed at the middle of the music editing page, the audio display area 23 is placed below the lyric display area, and the word effect area 22 is placed below the audio display area.

In embodiments of the disclosure, the color tuning area, the word effect area, the audio display area and the lyric display area are all displayed on the music editing page.

In the disclosure, the interaction scheme is optimized, and the user can feel the simple and smooth operation while editing the target music material intuitively. In addition, the learning cost is reduced for the user, the music editing page is concise and clear, and the user edit the target music material efficiently.

Figure 29:
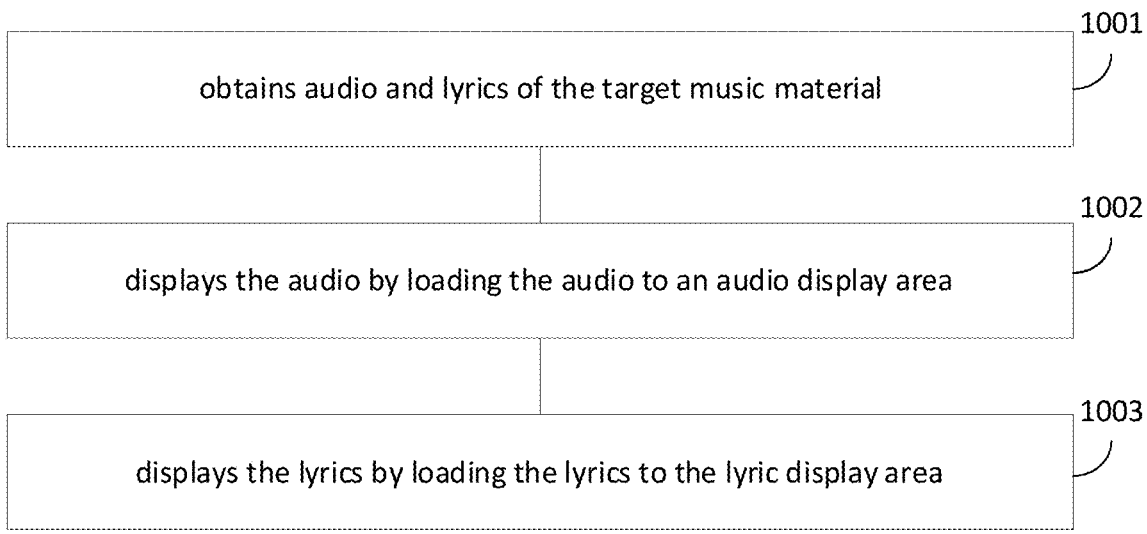
FIG. 29 is a flowchart illustrating a method for adding lyrics to a short video according to embodiments of the disclosure.

As a possible implementation, with the method for adding lyrics to a short video according to embodiments of the disclosure, the audio and the lyrics of the target music material are added to the music editing page after switching to the music editing page, which includes the following, as illustrated in FIG. 29.

At 1001, the audio and the lyrics of the target music material are obtained.

In embodiments of the disclosure, after jumping to the music editing page, the target music material can be loaded into the music editing page. The audio and the lyrics of the target music material are obtained separately based on the loaded target music. The audio is added to the audio display area, and the lyrics are loaded to the lyric display area.

In some examples, for acquiring the audio and the lyrics, an obtaining instruction can be automatically generated, and the delivered audio and lyrics can be received. The audio and the lyrics can be obtained from a local server or a remote server.

At 1002, the audio is loaded into the audio display area and displayed.

For example, after the audio is obtained, the audio can be loaded into the audio display area and displayed. For loading the audio, the position of the audio display area can be determined, and the audio is filled in the location of the audio display area.

It is to be noted that when the audio of the target music material is obtained, for displaying the audio in the audio display area, a display manner can be set based on actual situations. For example, the audio of the target music material can be dynamically displayed in a form of dynamic sound waves.

At 1003, the lyrics are loaded into the lyric display area and displayed.

For example, after the lyrics are obtained, the lyrics can be loaded into the lyric display area and displayed. For loading the lyrics, the position of the lyric display area is determined, and the lyrics are filled into the position of the lyric display area.

In a possible implementation of the disclosure, before calling the first display page, a second display page can be called to select an effect element and the effect element is loaded into the short video.

In the disclosure, different needs of the user for processing the short video can be met.

Figure 30:
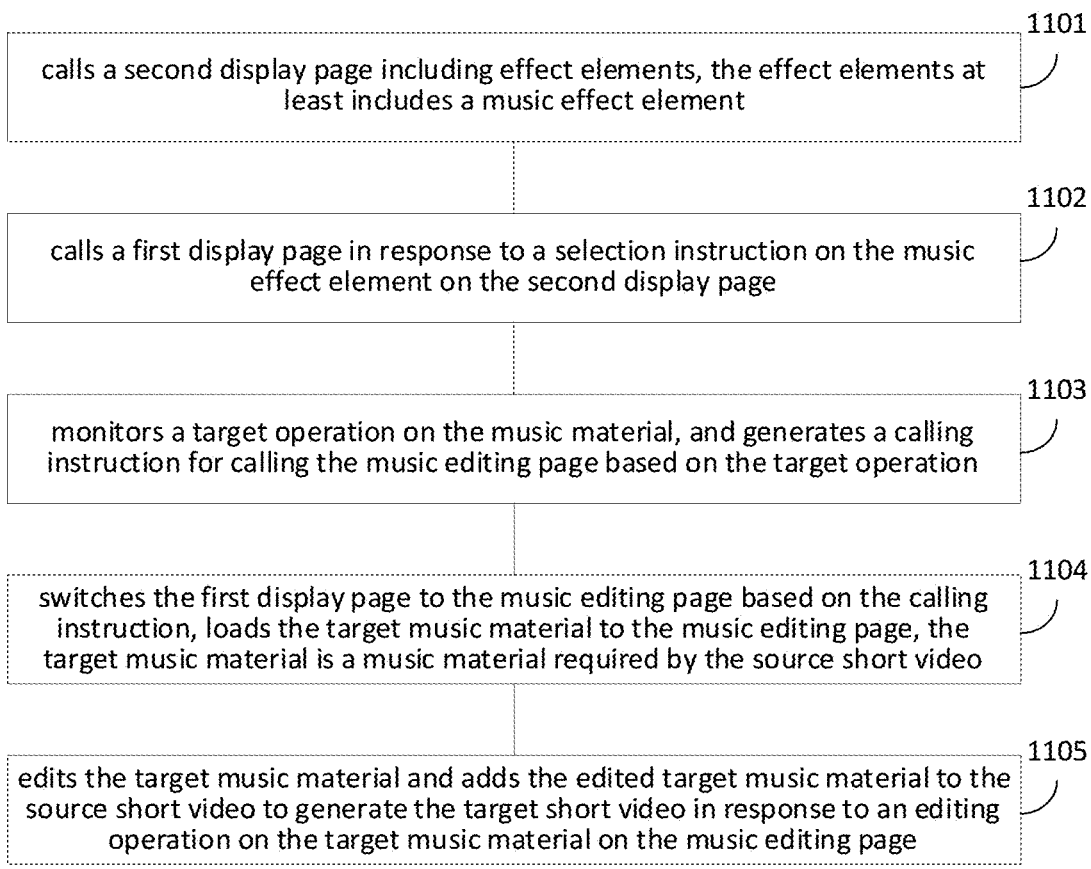
FIG. 30 is a flowchart illustrating a method for adding lyrics to a short video according to embodiments of the disclosure.

FIG. 30 is a flowchart illustrating a method for adding lyrics to a short video according to embodiments of the disclosure. As illustrated in FIG. 30, the method for adding lyrics to a short video according to the disclosure includes the following.

At 1101, a second display page including an effect element is called. The effect element includes at least a music effect element.

Figure 31:
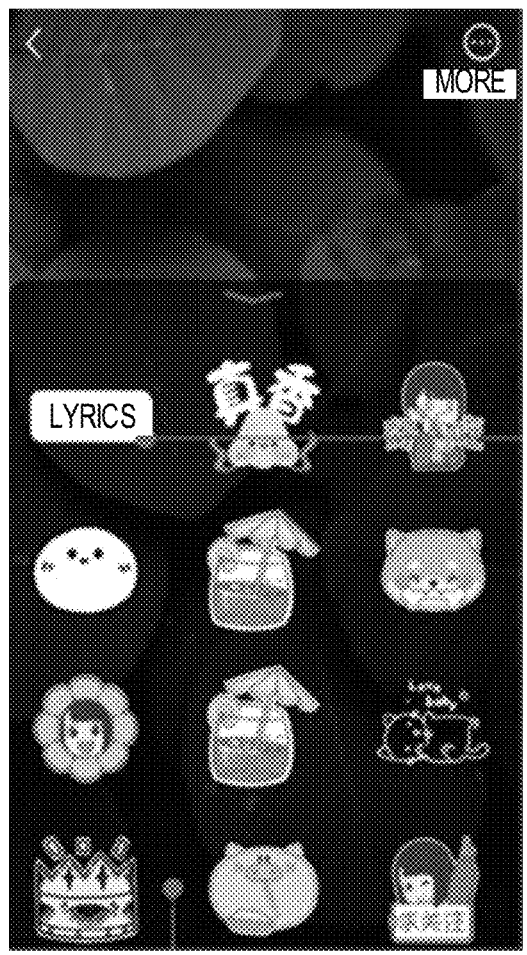
FIG. 31 is a schematic diagram illustrating a second display page according to embodiments of the disclosure.

The second display page can include multiple effect elements. The effect elements include at least the music effect element. For example, after the source short video is obtained, the second display page 3 as illustrated in FIG. 31 can be called.

At 1102, the first display interface is called in response to a selecting instruction on the music effect element on the second display page.

For example, after the user selects a corresponding music effect element by clicking, double-clicking, long-pressing, or sliding operation, the selecting instruction on the music effect element on the second display page can be responded to. After responding to the selecting instruction, the first display page is automatically switched to.

It is to be noted that at a first startup, a second reminder message can be displayed on a video shooting page for a second preset duration. The second reminder message is displayed at a calling control of the second display page. The second reminder message is configured to indicate that a music effect element is included on the second display page. The preset duration can be set based on actual conditions. For example, the second preset duration can be set to 5 seconds.

Figure 32:
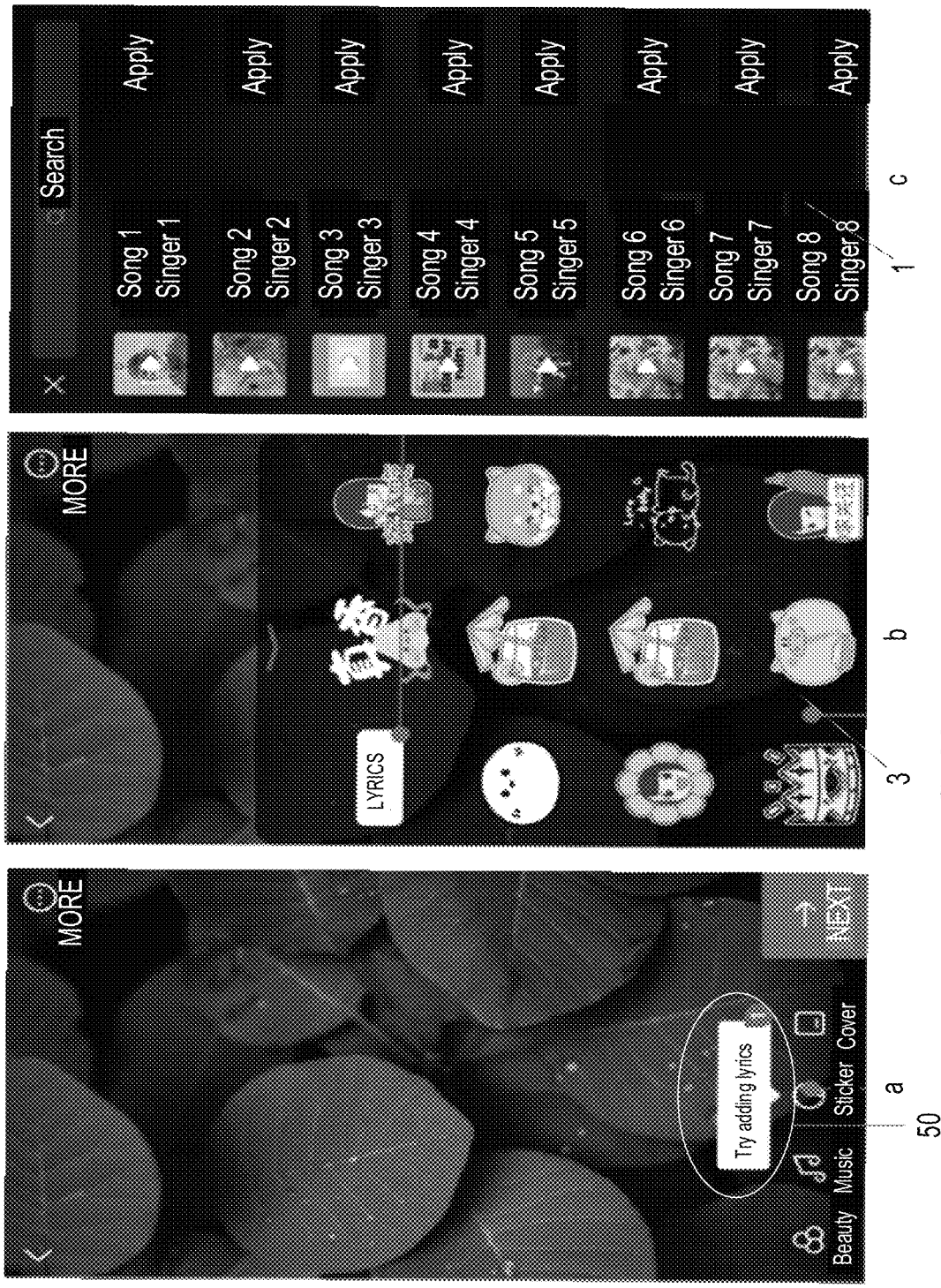
FIG. 32 is a schematic diagram illustrating a display manner of a second reminding message according to embodiments of the disclosure.

For example, as illustrated in FIG. 32(a), at the first startup, after the source short video is obtained, the second reminder message "Try adding lyrics" can be displayed at the effect icon 50 on the video shooting page for 5 seconds. Further, as illustrated in FIG. 32(b), in response to the selecting instruction on the music effect element on the second display page 3, the first display page 1 illustrated as FIG. 32(c) is switched to.

It is to be noted that in addition to the second reminder message, the following reminder messages may also be displayed on the video shooting page, such as a third reminder message, a fourth reminder message, and a fifth reminder message. The third reminder message is configured to indicate that a cover effect element is included on the second display page. The fourth reminder message is configured to indicate that a background effect element is included on the second display page. The fifth reminder message is configured to indicate hot/new songs recommendation.

Only one type of reminder message may be displayed on a page at the same time. That is, the reminder messages may be displayed on the video shooting page in a preset order. For example, the order can be: the second reminder message, the third reminder message, the fourth reminder message, and then the fifth reminder message.

At 1103, the target operation on the music material is monitored, and a calling instruction for calling the music editing page is generated based on the target operation.

At 1104, the first display page is switched to the music editing page based on the calling instruction, and the target music material is loaded to the music editing page. The target music material is a music material required by the source short video.

At 1105, the target music material is edited and loaded to the source short video to generate the target short video in response to an editing operation on the target music material on the music editing interface.

It is to be noted that, the descriptions of blocks 1103 to 1105 can be seen from those of blocks 902 to 904, which are not repeated here.

With the method for adding lyrics to a short video according to embodiments of the disclosure, the effect element is selected by calling the second display page including the effect elements. The first display page is called in response to the selecting instruction on the music effect element on the second display page. After the editing of the effect element, the first display page is switched to. After it is monitored that there is the target operation, the first display page is switched to the music editing page to edit the target music material to obtain the target short video.

In the disclosure, the number of interactions is reduced, the operation time is shortened, various needs of the user for processing the short video is met, and the user experience is improved.

Further, in the disclosure, the color tuning area, the word effect area, the audio display area, and the lyric display area are all displayed on the music editing page.

In the disclosure, after switching to the music editing page, the user can intuitively perform the target music material, which makes user operations smooth and convenient, reduces the learning cost for the user and improves the user experience.

FIGS. 33-40 are block diagrams illustrating a device for adding lyrics to a short video according to embodiments of the disclosure.

Figure 33:
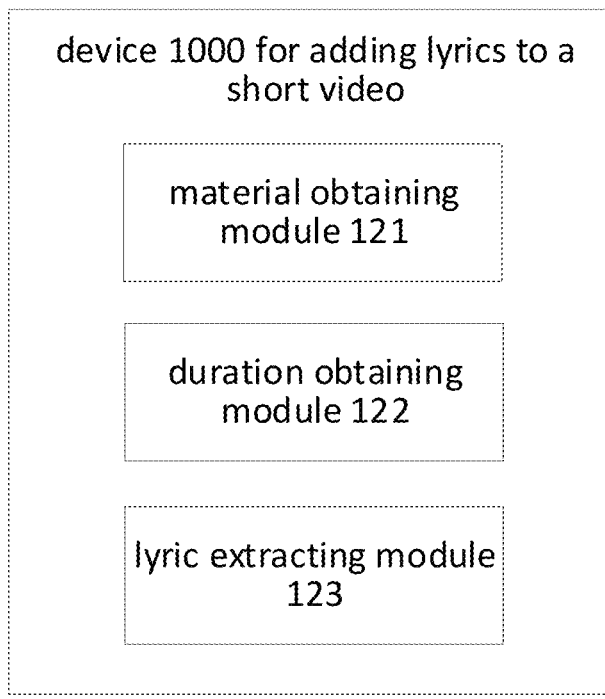
FIG. 33 is a block diagram illustrating a device for adding lyrics to a short video according to embodiments of the disclosure.

As illustrated in FIG. 33, the device 1000 includes a material obtaining module 121, a duration obtaining module 122, and a lyric extracting module 123.

The material obtaining module 121 is configured to obtain a music material required by a short video.

The duration obtaining module 122 is configured to generate a target music material corresponding to the short video based on a first playback duration, where the playback duration of the target music material matches the first playback duration.

The lyric extracting module 123 is configured to generate a lyric sticker corresponding to the target music material based on lyrics extracted from the target music material and display the short video added with the lyric sticker.

Figure 34:
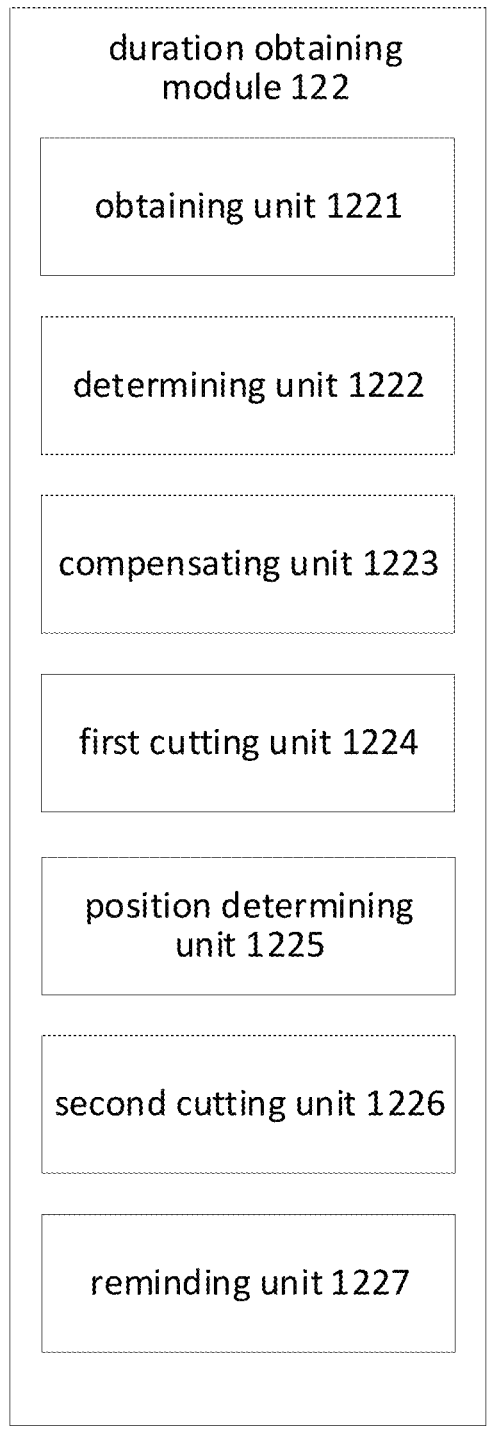
FIG. 34 is a block diagram illustrating a device for adding lyrics to a short video according to embodiments of the disclosure.

In some embodiments of the disclosure, as illustrated in FIG. 34, the duration obtaining module 122 includes: an obtaining unit 1221, a determining unit 1222, a compensating unit 1223, and a first cutting unit 1224. The obtaining unit 1221 is configured to obtain a second playback duration of the music material. The determining unit 1222 is configured to determine whether the first playback duration is greater than the second playback duration. The compensating unit 1223 is configured to generate the target music material by compensating the playback duration of the music material to the first playback duration when the first playback duration is greater than the second playback duration. The first cutting unit 1224 is configured to generate the target music material by cutting the music material when the first playback duration is less than the second playback duration.

In some embodiments of the disclosure, the compensating unit 1223 illustrated in FIG. 34 is configured to obtain a duration difference between the first playback duration and the second playback duration, and compensate the second playback duration to the first playback duration by playing the music material in a loop based on the duration difference.

In some embodiments of the disclosure, as illustrated in FIG. 34, the duration obtaining module 122 further includes a position determining unit 1225 and a second cutting unit 1226. The position determining unit 1225 is configured to determine a cutting position of the music material based on a cutting operation of the music material when the first playback duration is less than the second playback duration. The second cutting unit 1226 is configured to generate the target music material by cutting the music material at the cutting position.

In some embodiments of the disclosure, as illustrated in FIG. 34, the duration obtaining module 122 further includes a reminding unit 1227. The reminding unit 1227 is configured to generate and display a first reminder message indicating that the cutting operation of the music material fails when the first playback duration is greater than the second playback duration.

Figure 35:
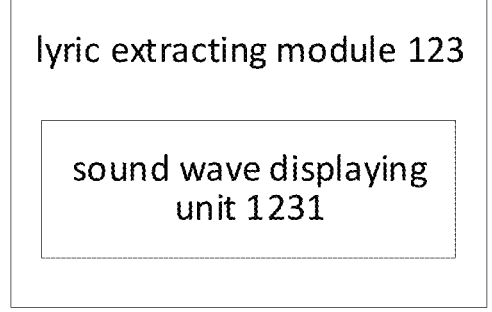
FIG. 35 is a block diagram illustrating a device for adding lyrics to a short video according to embodiments of the disclosure.

In some embodiments of the disclosure, as illustrated in FIG. 35, the lyric extracting module 123 includes a sound wave displaying unit 1231. The sound wave displaying unit 1231 is configured to identify a segment without lyrics from the target music material, determine a dynamic effect of sound waves corresponding to the segment without lyrics based on an amplitude of the audio, and display the sound waves with the dynamic effect.

In some embodiments of the disclosure, the lyric extracting module 123 illustrated in FIG. 35 is further configured to extract the lyrics from the target music material, generate a playback timeline for the lyric sticker based on the playback time of the target music material, synchronize the playback timeline of the lyric sticker and the playback timeline of the short video, and synchronously update the lyrics currently required by the lyric sticker based on a current playback progress of the short video.

Figure 36:
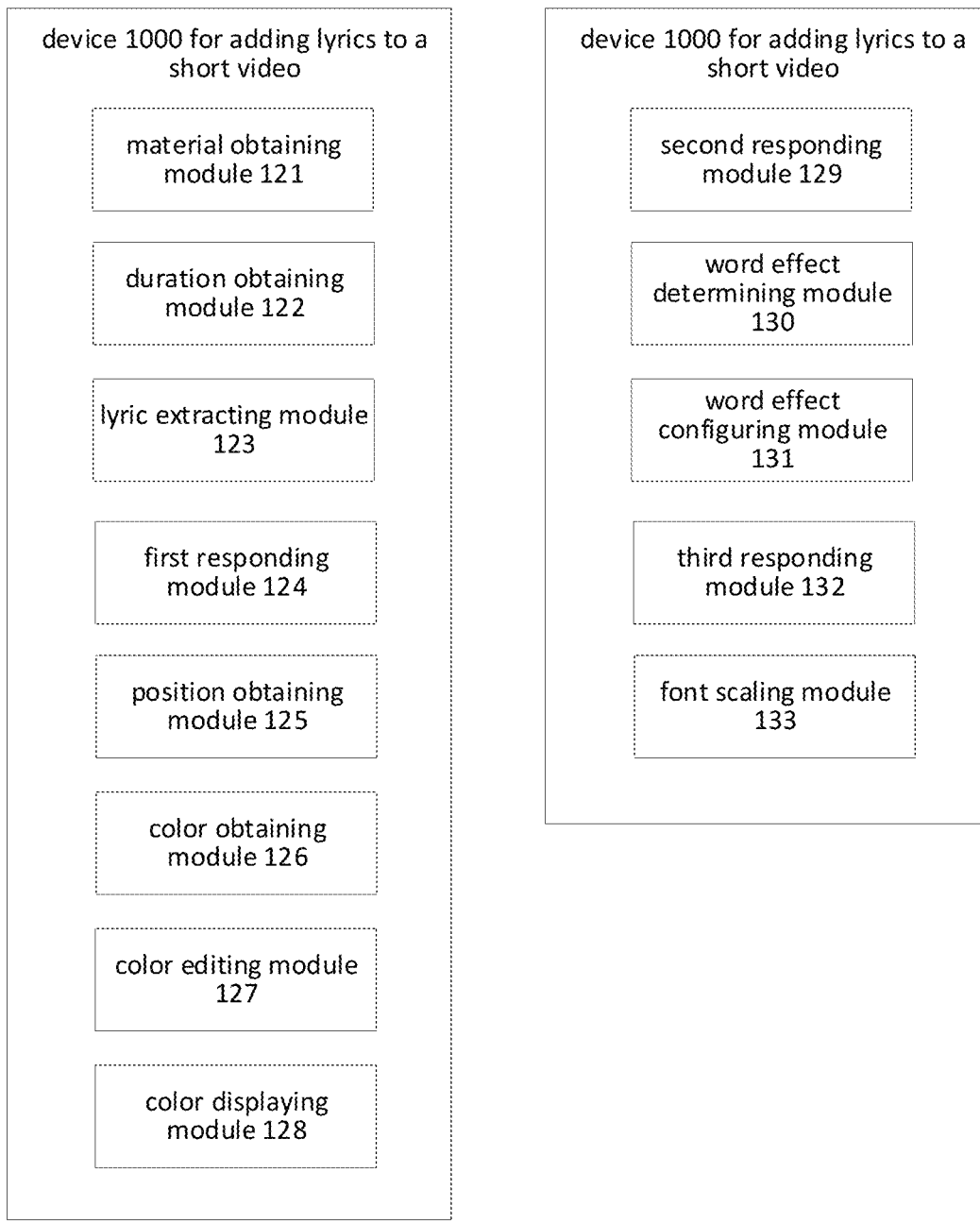
FIG. 36 is a block diagram illustrating a device for adding lyrics to a short video according to embodiments of the disclosure.

In some embodiments of the disclosure, as illustrated in FIG. 36, the device 1000 further includes a first responding module 124, a position obtaining module 125, a color obtaining module 126, and a color editing module 127. The first responding module 124 is configured to respond to a color editing operation of the lyrics after generating the lyric sticker corresponding to the target music material and displaying the short video added with the lyric sticker. The position obtaining module 125 is configured to obtain a staying position of the color editing operation in a color tuning area. The color obtaining module 126 is configured to obtain a target color to be used for the lyrics of the target music material based on the staying position. The color editing module 127 is configured to edit a current color of the lyrics to the target color.

Figure 37:
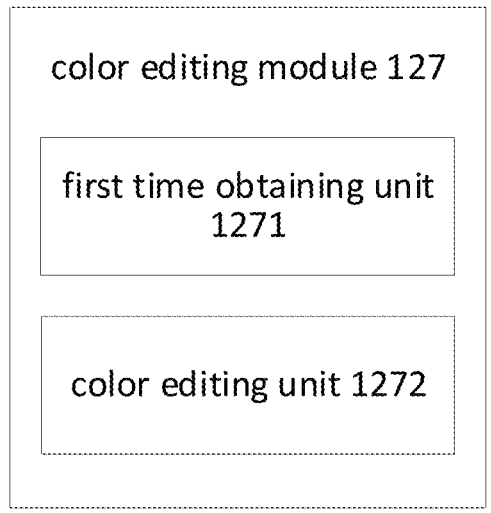
FIG. 37 is a block diagram illustrating a device for adding lyrics to a short video according to embodiments of the disclosure.

In some embodiments of the disclosure, as illustrated in FIG. 37, the color editing module 127 includes a first time obtaining unit 1271 and a color editing unit 1272. The first time obtaining unit 1271 is configured to obtain a current playback time of the target music material. The color editing unit 1272 is configured edit the current color of the lyrics to the target color starting from the current playback time.

In some embodiments of the disclosure, as illustrated in FIG. 36, the device 1000 further includes a color displaying module 128. The color displaying module 128 is configured to display a floating window carrying the target color at the staying position after obtaining the target color to be used for the lyrics of the target music material based on the staying position. The floating window is configured to enlarge an area of the target color and display the enlarged target color.

In some embodiments of the disclosure, the color tuning area is configured to display each candidate color. The color tuning area includes an outer frame and a filled area. The filled area includes multiple sub-areas, and each sub-area corresponds to a respective candidate color. The filled region is filled with a color determined based on a correspondence between sub-areas and candidate colors.

In some embodiments of the disclosure, as illustrated in FIG. 36, the device 1000 further includes: a second responding module 129, a word effect determining module 130, and a word effect configuring module 131. The second responding module 129 is configured to respond to a word effect selection operation after generating the lyric sticker corresponding to the target music material and displaying the short video added with the lyric sticker. The word effect determining module 130 is configured to determine a selected target word effect based on a position of the word effect selection operation on the music editing page. The word effect configuring module 131 is configured to configure an effect of the lyrics based on the target word effect and display the processed lyrics on the music editing page.

Figure 38:
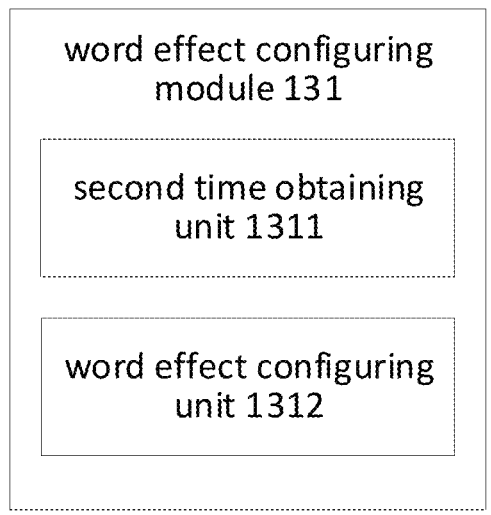
FIG. 38 is a block diagram illustrating a device for adding lyrics to a short video according to embodiments of the disclosure.

In some embodiments of the disclosure, as illustrated in FIG. 38, the word effect configuring module 131 includes a second time obtaining unit 1311 and a word effect configuring unit 1312. The second time obtaining unit 1311 is configured to obtain a current playback time of the target music material. The word effect configuring unit 1312 is configured to configure an effect of the lyrics based on the target word effect starting from the current playback time.

In some embodiments of the disclosure, as illustrated in FIG. 36, the device 1000 further includes a third responding module 132 and a font scaling module 133. The third responding module 132 is configured to respond to a lyric scaling operation of the lyrics after generating the lyric sticker corresponding to the target music material and displaying the short video added with the lyric sticker. The font scaling module 133 is configured to scale a font size of the lyrics based on the scaling operation.

Figure 39:
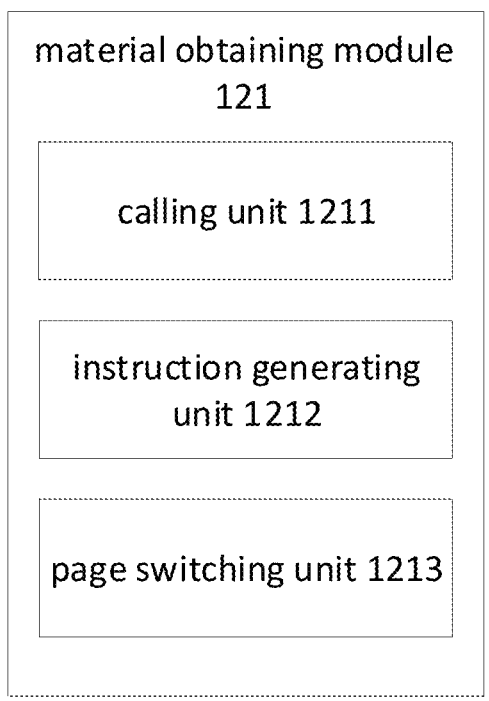
FIG. 39 is a block diagram illustrating a device for adding lyrics to a short video according to embodiments of the disclosure.

In some embodiments of the disclosure, as illustrated in FIG. 39, the material obtaining module 121 further includes a calling unit 1211, an instruction generating unit 1212, and a page switching unit 1213. The calling unit 1211 is configured to call a first display page including at least one candidate music material. The instruction generating unit 1212 is configured to monitor the target operation on the candidate music material, and generate a calling instruction for calling the music editing page based on the target operation when monitoring that there is the target operation. The page switching unit 1213 is configured to switch the first display page to the music editing page based on the calling instruction and load the music material to the music editing page.

Figure 40:
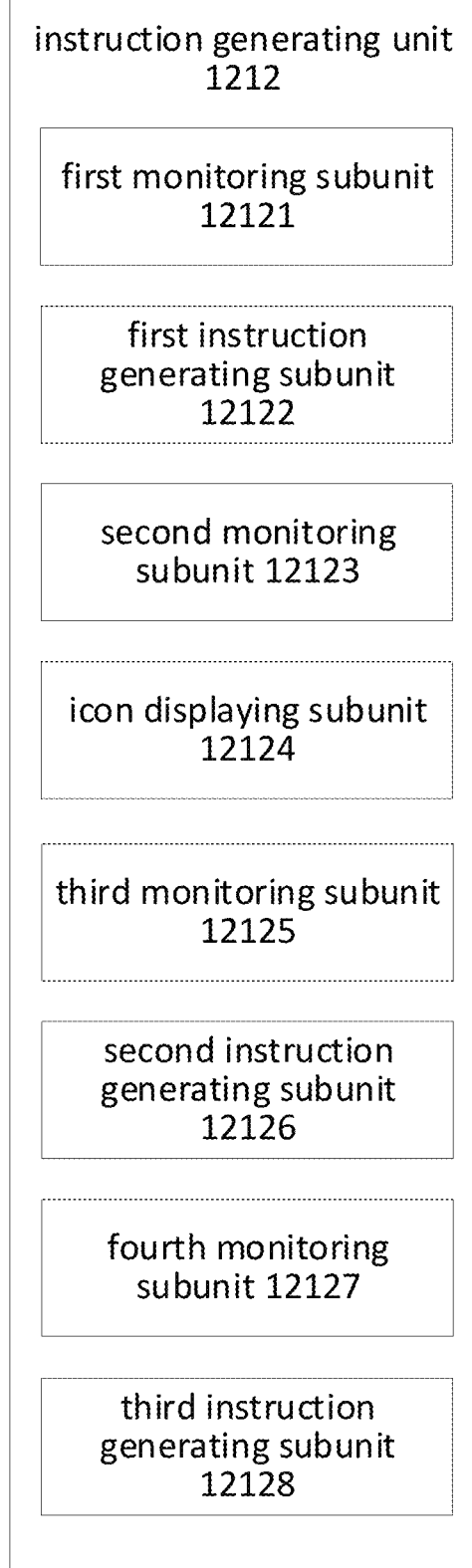
FIG. 40 is a block diagram illustrating a device for adding lyrics to a short video according to embodiments of the disclosure.

In some embodiments of the disclosure, as illustrated in FIG. 40, the instruction generating unit 1212 includes a first monitoring subunit 12121 and a first instruction generating subunit 12122. The first monitoring subunit 12121 is configured to monitor a clicking operation on a selection control of the music material. The first instruction generating subunit 12122 is configured to generate the calling instruction based on the clicking operation on the selection control when monitoring that there is the clicking operation on the selection control.

In some embodiments of the disclosure, as illustrated in FIG. 40, the instruction generating unit 1212 further includes a second monitoring subunit 12123 and an icon displaying subunit 12124. The instruction generating subunit 12123 is configured to monitor the clicking operation on the playback control of the music material. The icon displaying subunit 12124 is configured to display a favorites icon of the music material on the first display page when it is monitored that there is the clicking operation of the playback control.

In some embodiments of the disclosure, as illustrated in FIG. 40, the instruction generating unit 1212 further includes a third monitoring subunit 12125 and a second instruction generating subunit 12126. The third monitoring subunit 12125 is configured to monitor a clicking operation on the playback control of the music material. The second instruction generating subunit 12126 is configured to generate the calling instruction based on the clicking operation on the playback control when it is monitored that there is the clicking operation on the playback control.

In some embodiments of the disclosure, as illustrated in FIG. 40, the instruction generating unit 1212 further includes a fourth monitoring subunit 12127 and a third instruction generating subunit 12128. The fourth monitoring subunit 12127 is configured to monitor a double-clicking operation, a long-pressing operation, or a sliding operation on the music material. The third instruction generating subunit 12128 is configured to generate the calling instruction based on the double-clicking operation, the long-pressing operation or the sliding operation, when it is monitored that there is the double-clicking operation, the long-pressing operation or the sliding operation.

Regarding the device in the foregoing embodiments, the specific manner in which each module performs operation has been described in detail in embodiments of the method, and detailed description will not be given here.

In some embodiments of the disclosure, after the music material to be used by the short video and the first playback duration of the short video are obtained, the target music material having the playback duration matching the first playback duration is generated. The lyrics are extracted to generate the lyric sticker, and the lyric sticker is added to the short video. The lyric sticker is dynamically displayed in the short video as the target music material.

In the disclosure, the interaction solution is simplified, the number of interactions is reduced, the operation time is shortened, the learning cost is reduced, and the user experience is improved.

Figure 41:
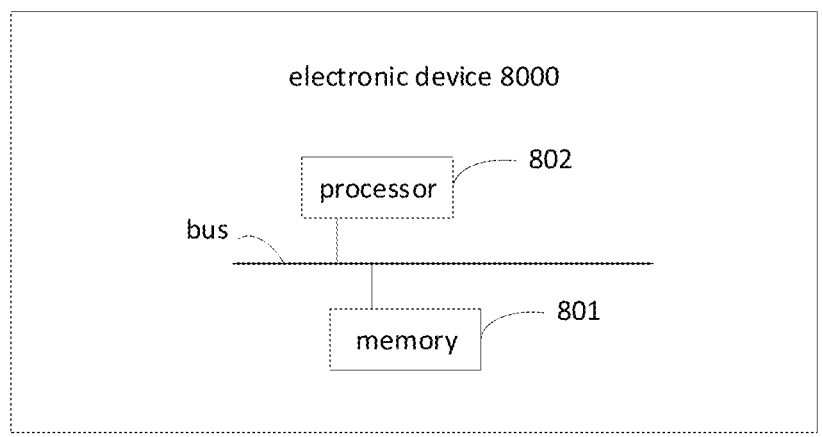
FIG. 41 is a block diagram illustrating an electronic device according to embodiments of the disclosure.

To implement the above embodiments, the disclosure further provides an electronic device. As illustrated in FIG. 41, the electronic device 8000 includes a processor 801 and one or more memories 802 for storing executable instructions executable by the processor 801. The processor 801 is configured to execute a method for adding lyrics to a short video as described in the foregoing embodiments. The processor 801 and the memory 802 are connected through a communication bus.

In order to implement the above-mentioned embodiments, the disclosure further provides a storage medium including instructions, for example, the memory 802 including instructions. The above-mentioned instructions can be executed by a processor 801 of a device 1000 to execute the above-mentioned method. For example, the storage medium may be a non-transitory computer-readable storage medium. For example, the non-transitory computer-readable storage medium may be ROM, random access memory (RAM), CD-ROM, magnetic tape, floppy disk, and optical data storage device.

Other embodiments of the disclosure will be apparent to those skilled in the art after considering the description and practicing the disclosure disclosed herein. The disclosure is intended to cover any variations, uses or adaptive changes of the disclosure. These variations, uses or adaptive changes are in accordance with general principles of the disclosure and include common knowledge or technical means in the art that are not disclosed herein. The description and embodiments are to be regarded as illustrative only, and the real scope and spirit of the disclosure are pointed out in the attached claims.

It should be understood that the disclosure is not limited to the precise structures described above and illustrated in the drawings, and various modifications and changes may be made without departing from the scope thereof. The scope of the disclosure is merely limited by the attached claims.

What is claimed is:

1. A method for adding lyrics to a short video, comprising:
   obtaining a first playback duration of a short video;
   generating a target music material corresponding to the short video based on the first playback duration by processing a candidate music material displayed on a first display page, wherein a playback duration of the target music material matches the first playback duration;
   generating a lyric sticker corresponding to the target music material based on lyrics extracted from the target music material, and displaying the short video added with the lyric sticker; and
   switching the first display page to a music editing page on which at least an area for editing color of the lyrics and an area for editing word effect of the lyrics separated from the area for editing color are displayed, and automatically loading the lyrics corresponding to the candidate music material in response to selecting the candidate music material by performing a clicking operation on a selection control or a playing control of the candidate music material on the first display page;
   wherein the method further comprises:
   identifying a segment without lyrics from the target music material and obtaining a beginning time and an ending time of the segment;
   determining a dynamic effect for sound waves corresponding to the segment without lyrics based on an amplitude of an audio; and
   displaying the sound waves with the dynamic effect without displaying the lyrics from the beginning time to the ending time, and displaying the lyrics without displaying the sound waves at other times.

2. The method of claim 1, wherein said generating the target music material comprises:
   obtaining the candidate music material and a second playback duration of the candidate music material;
   generating the target music material by compensating the second playback duration to the first playback duration in response to the first playback duration being greater than the second playback duration; and
   generating the target music material by cutting the candidate music material in response to the first playback duration being less than the second playback duration.

3. The method of claim 2, wherein said compensating the second playback duration comprises:
   obtaining a duration difference between the first playback duration and the second playback duration, and
   compensating the second playback duration to the first playback duration by playing the candidate music material in a loop based on the duration difference.

4. The method of claim 2, wherein said cutting the candidate music material comprises:
   determining a cutting position of the candidate music material based on a cutting operation on the candidate music material; and
   cutting the candidate music material at the cutting position.

5. The method of claim 1, wherein said generating the lyric sticker comprises:
   generating a playback timeline for the lyric sticker based on a playback time of the target music material;
   synchronizing the playback timeline of the lyric sticker with a playback timeline of the short video, and
   synchronously updating the lyrics of the lyric sticker based on a playback progress of the short video.

6. The method of claim 1, further comprising:
   obtaining a staying position of a color editing operation of the lyrics in a color tuning area;
   obtaining a target color for the lyrics of the target music material based on the staying position; and
   editing the lyrics to the target color.

7. The method of claim 6, further comprising:
   displaying a floating window at the staying position, wherein the floating window is configured to display and enlarge an area of the target color.

8. The method of claim 1, further comprising:
   determining a target word effect based on a position of a word effect selection operation on a music editing page; and displaying the lyrics configured with the target word effect.

9. The method of claim 1, further comprising:
scaling a font size of the lyrics based on a lyric scaling operation.

10. The method of claim 1, wherein the method further comprises:
displaying a favorites icon of the candidate music material on the first display page in response to a clicking operation on a playing control of the candidate music material on the first display page.

11. An electronic device, comprising:
a processor; and
a memory, configured to store instructions executable by the processor;
wherein in response to the instructions are executed by the processor, the processor is configured to:
obtain a first playback duration of a short video;
generate a target music material corresponding to the short video based on the first playback duration by processing a candidate music material displayed on a first display page, wherein a playback duration of the target music material matches the first playback duration;
generate a lyric sticker corresponding to the target music material based on lyrics extracted from the target music material, and display the short video added with the lyric sticker; and
switch the first display page to a music editing page on which at least an area for editing color of the lyrics and an area for editing word effect of the lyrics separated from the area for editing color are displayed, and automatically load the lyrics corresponding to the candidate music material in response to selecting the candidate music material by performing a clicking operation on a selection control or a playing control of the candidate music material on the first display page;
wherein the processor is further configured to:
identify a segment without lyrics from the target music material and obtaining a beginning time and an ending time of the segment;
determine a dynamic effect for sound waves corresponding to the segment without lyrics based on an amplitude of an audio; and
display the sound waves with the dynamic effect without displaying the lyrics from the beginning time to the ending time, and display the lyrics without displaying the sound waves at other times.

12. The electronic device of claim 11, wherein the processor is further configured to:
obtain the candidate music material and a second playback duration of the candidate music material;
generate the target music material by compensating the second playback duration to the first playback duration in response to the first playback duration being greater than the second playback duration; and
generate the target music material by cutting the candidate music material in response to the first playback duration being less than the second playback duration.

13. The electronic device of claim 12, wherein the processor is further configured to:
obtain a duration difference between the first playback duration and the second playback duration, and
compensate the second playback duration to the first playback duration by playing the candidate music material in a loop based on the duration difference.

14. The electronic device of claim 12, wherein the processor is further configured to:
determine a cutting position of the candidate music material based on a cutting operation on the candidate music material; and
cut the candidate music material at the cutting position.

15. The electronic device of claim 11, wherein the processor is further configured to:
generate a playback timeline for the lyric sticker based on a playback time of the target music material;
synchronize the playback timeline of the lyric sticker with a playback timeline of the short video, and
synchronously update the lyrics of the lyric sticker based on a playback progress of the short video.

16. A non-transitory computer readable storage medium, configured to store instructions, in response to the instructions being executed by one or more processors, the one or more processors are caused to perform steps comprising:
obtaining a first playback duration of a short video;
generating a target music material corresponding to the short video based on the first playback duration by processing a candidate music material displayed on a first display page, wherein a playback duration of the target music material matches the first playback duration; and
generating a lyric sticker corresponding to the target music material based on lyrics extracted from the target music material, and displaying the short video added with the lyric sticker; and
switching the first display page to a music editing page on which at least an area for editing color of the lyrics and an area for editing word effect of the lyrics separated from the area for editing color are displayed, and automatically loading the lyrics corresponding to the candidate music material in response to selecting the candidate music material by performing a clicking operation on a selection control or a playing control of the candidate music material on the first display page;
wherein the music editing page contains areas for editing color, word effect, or position of the lyrics;
wherein the one or more processors are caused to perform steps comprising:
identifying a segment without lyrics from the target music material and obtaining a beginning time and an ending time of the segment;
determining a dynamic effect for sound waves corresponding to the segment without lyrics based on an amplitude of an audio; and
displaying the sound waves with the dynamic effect without displaying the lyrics from the beginning time to the ending time, and displaying the lyrics without displaying the sound waves at other times.

* * * * *